(12) United States Patent
Kampel

(10) Patent No.: US 6,246,863 B1
(45) Date of Patent: Jun. 12, 2001

(54) AVALANCHE TRANSCEIVER

(76) Inventor: Gerald Kampel, Hainbuchenstr. 67, D-82024, Taufkirchen (DE)

( * ) Notice: Subject to any disclaimer, the term of this patent is extended or adjusted under 35 U.S.C. 154(b) by 0 days.

(21) Appl. No.: 09/198,001

(22) Filed: Nov. 23, 1998

(30) Foreign Application Priority Data

Nov. 28, 1997 (DE) ............................................. 197 52 939

(51) Int. Cl.⁷ .................................................. G08B 1/08
(52) U.S. Cl. .............................. 455/100; 455/91; 455/73; 342/22
(58) Field of Search ................. 342/22; 455/91, 455/92, 98, 100, 73

(56) References Cited

U.S. PATENT DOCUMENTS

| 4,300,129 | * | 11/1981 | Cataldo | 340/539 |
| 5,172,110 | * | 12/1992 | Tiefengraber | 340/825.49 |
| 6,031,482 | * | 2/2000 | Lamaitre et al. | 342/22 |

FOREIGN PATENT DOCUMENTS

| 391 562 | 10/1990 | (AT) | G01S/11/00 |
| 30 46 895 | 9/1982 | (DE) | G01S/1/68 |
| 35 31 726 A1 | 3/1987 | (DE) | G01S/1/68 |
| 195 10 875 C1 | 9/1996 | (DE) | G01V/3/08 |

OTHER PUBLICATIONS

01/96 catalog of Ortovox Sportartikel Gmbh., p. 16 and accompanying insert.

"Press Release" and "Frequently Asked Questions" by Backcountry Access, Inc., dated Aug. 20, 1998.

* cited by examiner

*Primary Examiner*—Thanh Cong Le
*Assistant Examiner*—Alan T. Gantt
(74) *Attorney, Agent, or Firm*—Michael J. Weins; Jeffrey E. Semprebon

(57) ABSTRACT

An improved rescue device for locating persons buried by avalanches operates in either a transmit mode or a receive mode. A first belt terminator is lockably engagable with a first belt terminator receptor on a case, and is associated with a power switch. The power switch switches between a power on position and a power off position in response to the engagement and disengagement of the first belt terminator with the first belt terminator receptor, and preferably is also independently manually operable. A second belt terminator is lockably engagable with a second belt terminator receptor on the case, and is associated with a mode switch. The mode switch toggles between a transmit mode position and a receive mode position, and preferably is also independently manually operable. A signal processing system generates a visual display which provides graphic information to expedite searching. Prompt icons are displayed when a coarse search or a pin-point search should be conducted, when the stage of a multistage amplifier should be changed, or when the rescue device needs to be reoriented to obtain maximum signal strength. Preferably, the signal processing system also displays the signal strength as a bar graph and displays an estimated distance to the buried transmitter.

13 Claims, 14 Drawing Sheets

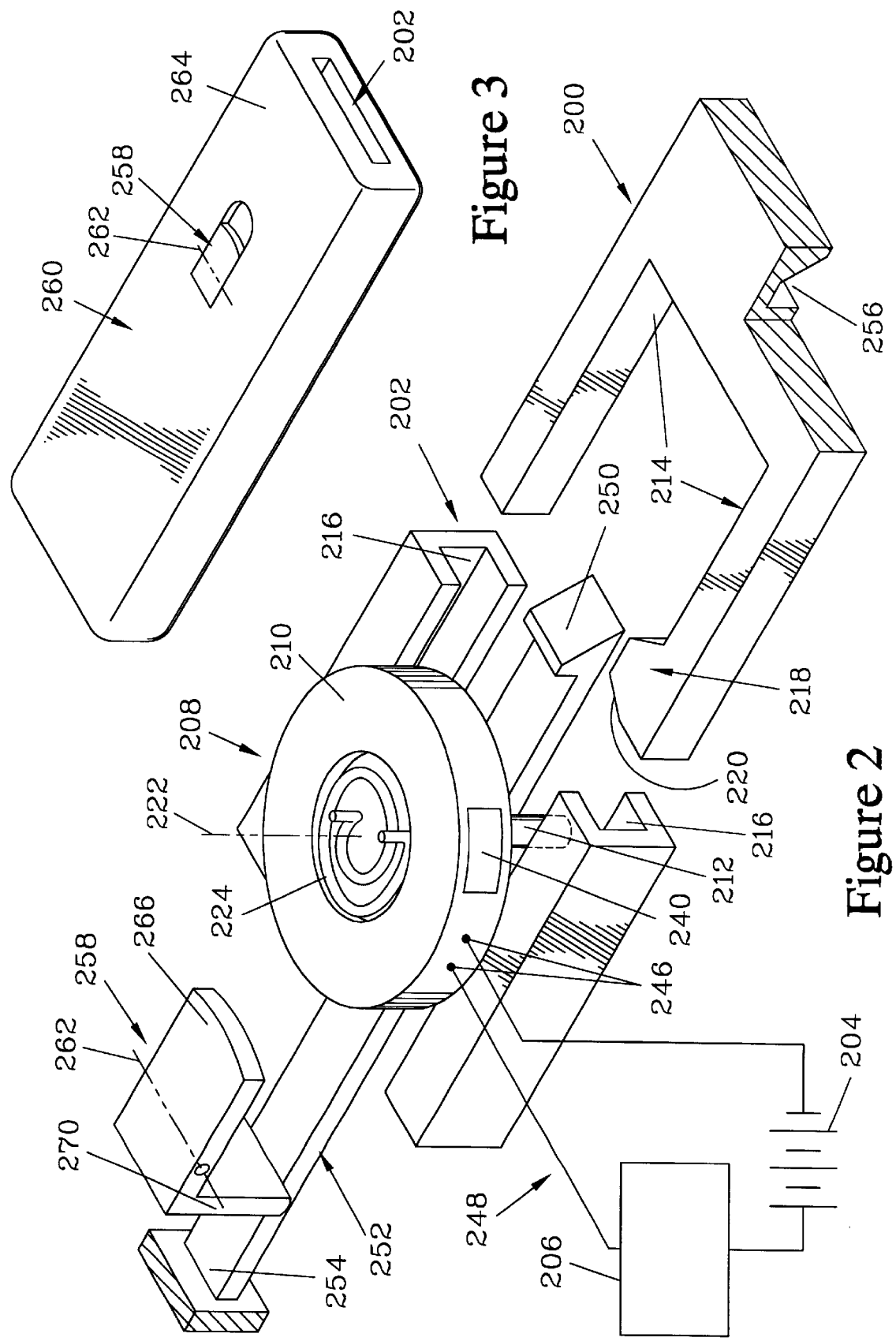

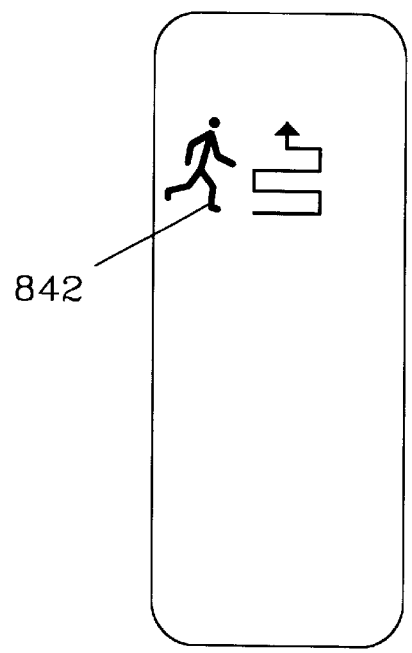
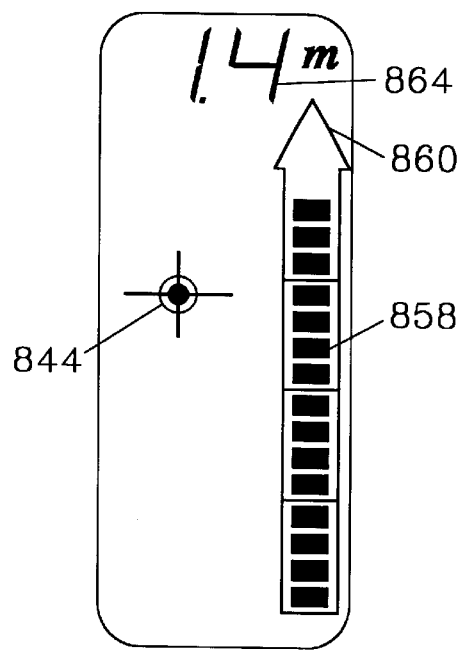
Figure 15  Figure 16
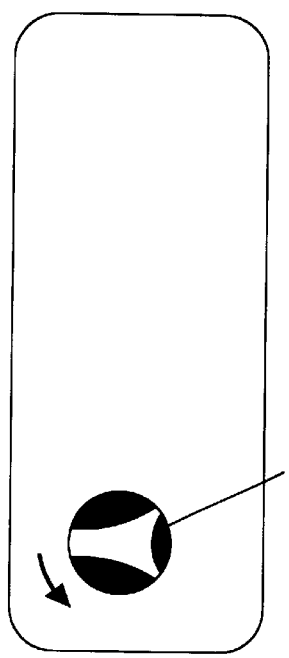
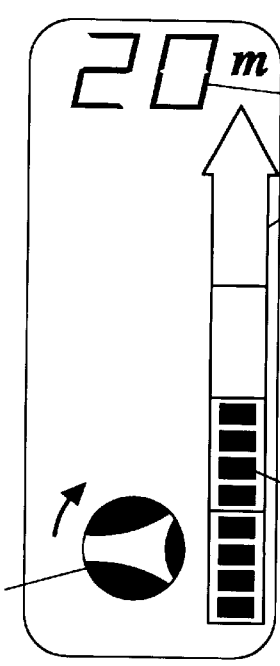
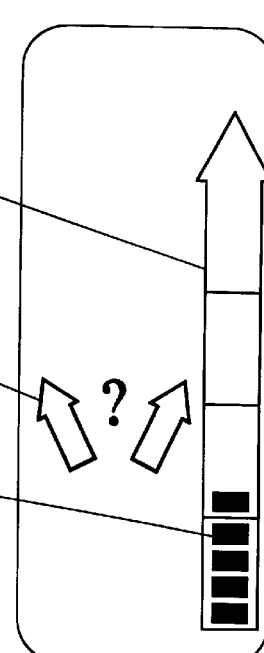
Figure 17  Figure 18  Figure 19

AVALANCHE TRANSCEIVER

BACKGROUND OF THE INVENTION

Rescue devices have been used by persons who are active in areas subject to avalanches. These devices typically may be employed either in a transmit mode or a receive mode. The device is normally carried or worn by the user while active in the transmit mode, where the device transmits a modulated electromagnetic signal at a specified frequency. If the user is buried by an avalanche, a rescuer using a similar device in the receive mode can detect the transmitted signal and use the signal to locate the buried person.

Such avalanche rescue devices typically have a variety of common elements. They have a transmitter which generates a pulsed electromagnetic signal at a specified frequency. An antenna is provided which serves to transmit the pulsed electromagnetic signals when they are being generated.

These avalanche rescue devices also have a receiver which, in combination with the antenna, is designed to receive signals being transmitted by another rescue device operating in the transmit mode. The transmitter, antenna, receiver, and a battery pack which serves as a power source, are packaged in a case and provide a compact unit which can be readily worn or carried. When worn, a harness constructed from one or more belts is provided for securing the case to a person. The harness in turn attaches to the case with a first belt connector and a second belt connector.

For safety reasons, it is desirable to design the rescue device such that it is difficult for the user to inadvertently carry the device with the power off or in the receive mode. If the device is not active in the transmit mode when the user is buried by an avalanche, rescuers may be unable to locate the user. One prior art rescue device which offers a high degree of safety is the F1 Focus avalanche transceiver device designed by the present inventor. The F1 Focus offers several features which reduce the likelihood of the device being worn or carried while not active in the transmit mode.

The F1 Focus device has an antenna, a transmitter/receiver circuit, and a battery which are housed in a case. The case is designed to be worn by the user, and when in use is attached to the user by a harness made up of belts. The belts connect to the case via a first belt connector and a second belt connector. The first belt connector is detachable from the case, while the second belt connector is permanently attached to the case.

The first belt connector has a T-shaped protrusion which is designed to fit into a receptor slot on the case. To connect the first belt connector to the case, the T-shaped protrusion is placed into the receptor slot and rotated to lock the T-shaped protrusion therein and secure the device to the user.

To assure that the device is active when secured to the user, the first belt connector is configured to operate a power switch which activates and deactivates the device. Insertion of the T-shaped protrusion into the receptor slot moves the power switch to a position where it completes a circuit between the battery and the transmitter/receiver circuit to activate the device. Turning and removing the T-shaped protrusion from the receptor slot allows the power switch to return to a position where the circuit is broken, and the device is inactive. While the interaction of the first belt connector and the power switch provides increased safety for the user, the requirement that the belts be attached to the case in use may be inconvenient when the user desires to carry the device in a pocket or pouch.

The device has a transmission status light on one side of the case. The transmission status light is positioned such that the user may wear the device with the transmission status light readily visible. The transmission status light is illuminated when the device is active in the transmit mode, providing notice of such to the user.

The device also has a combination mode/sensitivity switch which allows the user to manually switch the device between its transmit and receive modes, and, when the device is in the receive mode, allows the user to adjust the sensitivity of the receiver. The mode/sensitivity switch is a rotary switch having a transmit position, where the transmitter is active, and a number of receive positions in which the receiver is active. The different receive positions correspond to decreasing levels of sensitivity of the receiver when detecting a transmitted signal.

The mode/sensitivity switch also has a transmit lock device. When the mode/sensitivity switch is in the transmit position, the transmit lock device prevents the user from turning the mode/sensitivity switch unless the transmit lock device is first manually retracted. The transmit lock device thus helps prevent the user from inadvertently turning the device from the transmit mode to the receive mode. The mode/sensitivity switch may be freely turned from any of the receive positions to the transmit position.

When being used in the receive mode to locate a buried person, the user initially turns the mode/sensitivity switch to the highest sensitivity position. In this position, the response of the receiver to a transmitted signal received via the antenna is greatest. If no signal is detected, the user is trained to execute a broad search pattern until a signal is found. When a signal is detected, a speaker provides an audio output, the volume of which is proportional to the response of the receiver. As the searcher approaches the buried person along a field line of the transmitted signal, the strength of the signal received increases, and the response of the receiver correspondingly increases.

While most avalanche rescue devices provide an audio output, the F1 Focus additionally features three signal strength indicator lights. These signal strength indicator lights are progressively illuminated as the response of the receiver increases. When the response of the receiver is sufficiently great that the audio output of the speaker is very loud and all three signal strength indicator lights are illuminated, the user turns the mode/sensitivity switch to the next receive position, where the response of the receiver to a given signal strength is reduced. This procedure is repeated until the least sensitive receive position of the mode/sensitivity switch is used. In this position, when the response of the receiver is sufficiently great that the audio output of the speaker is very loud and all three signal strength indicator lights are illuminated, the user is trained to execute a pinpoint search to determine the location of the buried person with a high degree of precision, and then digs down to uncover the buried person.

While the volume of the audio output and the three signal strength indicator lights provide the user an indication of the strength of the signal being received, this may or may not correspond to the distance to the buried person. If the signal is to continuously increase, the searcher must follow a curved field line to reach the buried person, rather than taking a straight path. Increased precision in the indication of signal strength helps provide notice to the user when they have moved off of the field line they are following and thus helps the user to effectively reach the buried person.

In an attempt to provide the user increased precision in indicating an estimated distance to the buried person, a device having a pair of antennas has been employed.

However, this device requires complicated circuitry to estimate the distance from the relative signal strengths received from each antenna, rather than simply measuring signal strength along a field line with a single antenna. The device then presents the distance on a digital display. Such dual antenna devices have been found to be sensitive to orientation, and may provide signal strength differences of 5:1 for differing orientations at the same distance.

A concern with all such rescue devices is the training required for their effective use. Speed in locating and uncovering the buried person is of primary importance in rescue situations, and any hesitation on the part of the rescuer may reduce the chance of survival of the buried person. Additionally, witnessing an avalanche is traumatic, and may impair the ability of the searcher to remember what appropriate actions to take. An additional concern when multiple searchers are employed is the possibility that one or more of the searchers may inadvertently have their rescue device in the transmit mode. This may interfere with the other searchers receiving signals from the buried person.

Thus, there is a need for a rescue device which does not require the belts to be attached for use, which provides increased precision in indicating signal strength to the user, and which is readily operated with minimal training and/or under traumatic conditions.

OBJECTS OF THE INVENTION

It is an object of the present invention to provide an avalanche transceiver which prompts the user to perform appropriate search actions.

It is an object of the present invention to provide an avalanche transceiver which prompts the user when to switch the sensitivity to a more appropriate range.

It is an object of the present invention to provide an avalanche transceiver which indicates to the user when the transceiver is moved away from orientation along an induction line transmitted by a buried transmitter.

It is an object of the present invention to provide an avalanche transceiver which provides the user a visual indication of the distance along the induction line to the buried transmitter.

It is an object of the present invention to provide an avalanche transceiver which uses a bar graph to indicate the strength of a signal received with a high degree of resolution.

It is an object of the present invention to provide an avalanche transceiver which is automatically turned on and placed in a transmit mode when strapped to the user.

It is an object of the present invention to provide an avalanche transceiver which cannot be turned off while it is strapped to the user.

It is an object of the present invention to provide an avalanche transceiver which can be turned on without requiring a strap being attached thereto.

It is an object of the present invention to provide avalanche transceiver which requires deliberate action be turned off.

It is an object of the present invention to provide avalanche transceiver which is automatically placed into a receive mode when removed from being strapped to the user.

It is an object of the present invention to provide an avalanche transceiver which assists multiple transceiver users in determining whether all users have switched their transceivers to a receive mode.

It is an object of the present invention to provide an avalanche transceiver which may remain connected to the user when placed into its receive mode.

It is an object of the present invention to provide an avalanche transceiver which can be readily switched from its receive mode to its transmit mode when not strapped to the user.

It is an object of the present invention to provide an avalanche transceiver which requires deliberate action to be switched from its transmit mode to its receive mode when not strapped to the user.

It is an object of the present invention to provide an avalanche transceiver having a transmit indicator which is activated when the transceiver is active in its transmit mode, the transmit indicator being positioned to be readily seen by the user when the transceiver is worn in alternative positions.

It is an object of the present invention to provide an avalanche transceiver which employs an LCD display to provide information to the user.

It is an object of the present invention to provide an avalanche transceiver which stores the highest signal amplitude value received, and warns the user when the current signal amplitude drops below a certain percentage of the stored signal amplitude value.

It is an object of the present invention to provide an avalanche transceiver which automatically updates the stored signal amplitude value when a higher signal amplitude is received.

It is an object of the present invention to provide an avalanche transceiver which has a curved case to comfortably fit against the body, with the controls and display of the transceiver facing the user's body for protection and warmth.

It is an object of the present invention to provide an avalanche transceiver which may be readily operated with one hand.

It is an object of the present invention to provide an avalanche transceiver which may be operated to distinguish one of multiple received signals.

It is an object of the present invention to provide an avalanche transceiver which provides an indication of the state of charge of its batteries.

SUMMARY OF THE INVENTION

The present invention is an improved rescue device for locating persons buried by an avalanche. The improvements are well suited to dual-purpose avalanche rescue devices which operate in either a transmit mode or a receive mode as discussed above in the Background of the Invention.

One aspect of the improvement of the present invention resides in a harness connector system for fastening belts to the case which houses the rescue device. The rescue device of the present invention has a first belt terminator which serves as the first belt connector. The first belt terminator is shaped to lockably engage a first belt terminator receptor which forms part of the case and may be an integral part thereof or attached thereto.

A power switch assembly is associated with the first belt terminator receptor. The power switch assembly has a power switch with a power on position and a power off position, as well as means for switching from the power on position to the power off position which are responsive to the engagement and disengagement of the first belt terminator with the first belt terminator receptor. When the power switch is in the power on position, power is available to both the transmitter and the receiver.

Means for releasing the first belt terminator from the first belt terminator receptor are provided. Preferably, the means for releasing the first belt terminator are configured such that neither a compressive load or shear load on the case will activate the release. One preferred means for release is a lift and turn locking mechanism.

It is further preferred that the means for power switching have a complementary means for mechanical activation which is independent of the first belt terminator. It is further preferred that the two means act in a cooperative manner providing a dual activated power on/off system. This dual activated power on/off system, while part of the harness connector system, is felt to have utility which extends beyond the harness connector system of the present invention.

The rescue device of the present invention has a second belt terminator which serves the second belt connector. A second belt terminator receptor is also provided which forms part of the case and may be an integral part thereof or attached thereto. The second belt terminator is shaped to lockably engage the second belt terminator receptor.

The rescue device of the present invention also has a mode switch which is associated with the second belt terminator receptor. The mode switch has a transmit mode position and a receive mode position. Means for toggling the mode switch to the transmit mode when the second belt terminator is engaged with the second belt terminator receptor and to the receive mode when the second belt terminator is not engaged with the second belt terminator receptor are provided.

The mode switch is preferably biassed to the receive mode position by a biassing means and the second belt terminator is configured such that, in addition to lockably engaging the second belt terminator receptor, the second belt terminator toggles the mode switch to the transmit mode position when so engaged.

Means for locking and releasing the second belt terminator are provided. Preferably, the means for locking and releasing the second belt terminator are configured such that neither a compressive load nor a shear load on the case will activate the release.

Preferably, supplemental means for toggling the mode switch are provided which are independent of the interaction between the second belt terminator and the second belt terminator receptor. Means for releasing the supplemental means for toggling the mode switch are provided which are preferably shared with the means for releasing the second belt terminator. This dual-activatable toggling mechanism is felt to have utility which extends beyond the harness connector system of the present invention.

The case of the present invention also contains additional features which form part of the preferred embodiments of the present invention. It is preferred that the case be configured such that it can be readily held in one hand. It is also preferred that the case have a top surface which is concave to conform to the body of the wearer. A LCD display is preferably provided on the concave top surface. Making the top surface concave encourages the wearer to maintain this surface next their body, providing both mechanical and thermal protection to the LCD display. It also preferred that a dial for changing the stage of a multistage amplifier of the rescue device be configured to allow the user to readily operate the dial with the same hand which holds the case. Transmission status lights are preferably provided on the sides of the rescue device so that, when the rescue device is worn by the user, the user can readily see whether the rescue device is powered and in the transmit mode.

The above described harness connector system and associated case has utility in and of itself, or may be combined with the following aspect of the invention, which relates to an on-board signal processing system for processing the signals being generated by a rescue device in the transmit mode and being received by the rescue device of the present invention. This signal processing system generates a visual display as part of its output, and presents information in graphic form which helps expedite the search process, including icons which prompt the searcher as to how to advance the search.

Similar to prior art rescue devices, the signal processing system includes a signal pre-processor which receives an antenna signal from the antenna of the searcher's rescue device, this signal being generated by the rescue device of the buried party. The signal pre-processor converts the antenna signal to an audio frequency signal. The audio frequency signal is processed through the multistage amplifier to provide a working signal with enhanced sensitivity of the audio output. The working signal is presented over a speaker.

The signal processing system of the present invention provides a means for sensing the stage in which the multistage amplifier is operating and providing a stage signal. The signal processing system further processes the working signal, and in some instances the input signal, in combination with the stage signal to provide prompts and other visual information to assist a rescuer in searching effectively. The signal processing system provides a variety of functions which assist the searcher. Preferably, there is a working signal interface pre-processor to make the working signal compatible with subsequent circuitry and microprocessors which are employed in the signal processing system when such signal conditioning is required.

The signal processing system is provided with means for determining whether a coarse search or a pin-point search should be conducted and causing an appropriate icon to be presented on the visual display when such a condition is met. Means are also provided to determine whether there is a need to change the stage of the multistage amplifier and, when the amplifier is about to saturate or provide an infinitesimal signal, to provide a notice to change the stage to a stage of greater or lesser sensitivity by turning the dial on the rescue device either up or down. Hereinafter, switching to an increased sensitivity position is defined as switching "up", and switching to a reduced sensitivity position is defined as switching "down". The signal processing system is also provided with means for providing notice as to when the rescue device needs to be reoriented to provide the maximum strength signal from the buried party. This means provides an appropriate icon when such occurs.

Preferably, the signal processing system also provides means for displaying the strength of the signal from the multistage amplifier as a bar graph. It is further preferred that the bar graph be framed in an icon shaped as an arrow. It is also preferred that the signal processing system have means for analyzing one of the signals generated by the receiver and converting the strength of the signal to an estimated distance to the buried transmitter, and displaying the distance on the visual display.

All of the above means are readily implementable either by circuitry or by use of appropriate interfaces and one or more microprocessors programmed with appropriate instruction sets.

BRIEF DESCRIPTION OF THE FIGURES

FIG. 2 is an exploded isometric view of one embodiment of a first belt terminator and an associated first belt terminator receptor which may be employed in the device shown in FIG. 1. In this embodiment, a power switch is biassed by a torsion spring to a power-off position. The first belt terminator engages the power switch to turn it to a power-on position. A spring-biassed first terminator latch is provided for lockably engaging the first belt terminator with the first belt terminator receptor.

FIG. 3 is a view showing a first terminator release tab which is pivotably mounted to a case and which, when lifted, releases the first terminator latch shown in FIG. 2.

FIGS. 15 through 19 show icons which may be displayed by the rescue analysis system shown in FIG. 14. The icons serve as prompts to indicate to the user what action should be taken to conduct a search.

BEST MODE OF CARRYING THE INVENTION INTO PRACTICE

Figure 1:
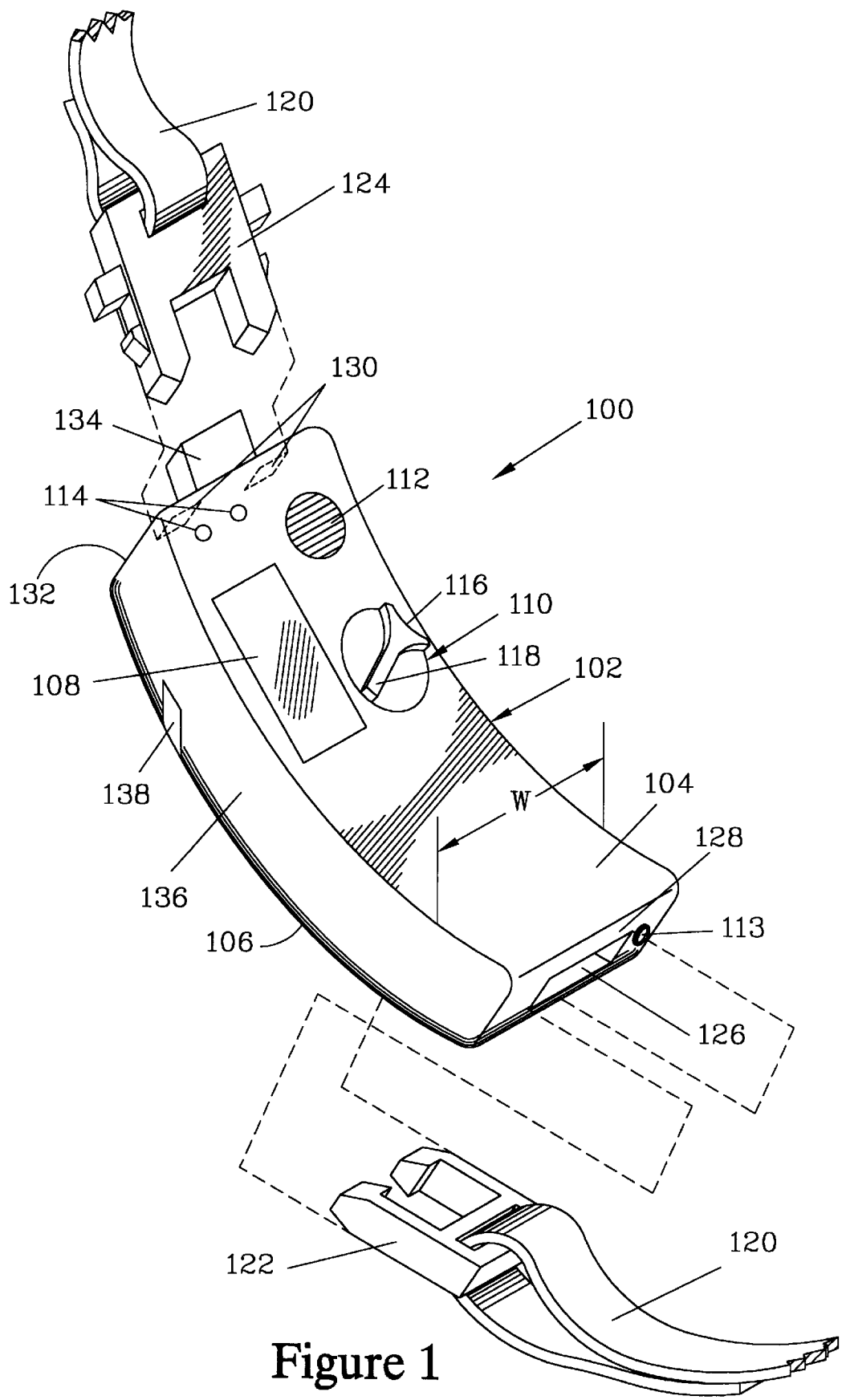
FIG. 1 is an isometric view of an improved rescue device which forms one embodiment of the present invention. The device has a case having a top surface. A viewing screen for display of information and a dial for adjusting the sensitivity of the device are provided on the top surface, and the case is designed to allow operation with a single hand. The device is attached to the user by a harness which is attached to the case by a first belt terminator and a second belt terminator. The first belt terminator engages a first belt terminator receptor on the case and controls whether power is provided to the device. The second belt terminator engages a second belt terminator receptor on the case and toggles the device between a transmit mode and a receive mode.

FIG. 1 is an isometric view of an improved rescue device 100 which includes a transmitter, an antenna, and a receiver (these internal elements are not shown) which are housed in a case 102. The case 102 is substantially shaped as a rectangular parallelepiped having a top surface 104 and a bottom surface 106 which form the bases of the parallelepiped. A viewing screen 108 for display of information to assist in locating a buried party is provided. The rescue device 100 also has a dial 110 for adjusting the sensitivity of the rescue device 100. A speaker 112 provides a complementary audio signal used in locating the buried party. A headphone jack 113 is preferably provided to allow a headphone to optionally replace the speaker 112. One or more display lights 114 are preferably provided, which provide information on the status of the search.

The case 102 of the rescue device 100 is preferably configured so as to be readily held and operated with a single hand. To facilitate such single-handed operation, it is preferred that the case have a width W not greater than about 7 cm. It is also preferred that the viewing screen 108, the dial 110, the speaker 112, and the display lights 114 be mounted on the top surface 104 of the case 102 so that they may be readily viewed and accessed when the rescue device is being operated single-handed. It is also preferred for the dial 110 to have a thumb recess 116 which can be used to adjust the dial 110 when being operated in a single-handed manner. A raised ridge 118 is also provided so as to facilitate turning the dial 110 with a second hand when the operator wishes to operate the rescue device 100 in a two handed manner.

The rescue device 100 is designed to be worn by parties who are in an avalanche sensitive area, and is maintained in position on the user by a harness which can be fashioned from belts 120. The belts 120 are attached to the case 102 by a first belt terminator 122 and a second belt terminator 124.

The first belt terminator 122 engages a first belt terminator receptor 126 which forms part of the case 102 and resides in a first harness support end 128 of the case 102. The first belt terminator 122, when inserted in the first belt terminator receptor 126, is lockably engaged therein and, when so inserted, assures that power is available to the transmitter and the receiver.

The second belt terminator 124 engages a second belt terminator receptor 130 which forms part of the case 102 and resides in a second harness support end 132 of the case 102. When the second belt terminator 124 is inserted in the second belt terminator receptor 130, the second belt terminator 124 is lockably engaged therein and, when so engaged, toggles a mode switch 134 to a transmit mode, where the transmitter receives power.

It is preferred that the case 102 be configured with the top surface 104 being slightly concave, to encourage the person wearing the case 102 to place the top surface 104 against their body to provide protection and a degree of warmth to the viewing screen 108, the speaker 112, and the display lights 114 when such are located on the top surface 104. It is also preferred that the case 102 have side panels 136 which have transmission status lights 138 therein, which are illuminated when the transmitter is receiving power, providing notice to the user that the rescue device which has been strapped on is in the transmit mode.

FIG. 2 is an exploded isometric view of one embodiment of a first belt terminator 200 and an associated first belt terminator receptor 202 which are designed to cooperate as discussed above providing power furnished by a battery 204 to a transmitter and receiver assembly 206. Power is supplied to the transmitter and receiver assembly 206 by a power switch 208 which is positioned with respect to the first belt terminator receptor 202 such that the power switch 208 is in a power off position as illustrated when the first belt terminator 200 is disconnected from the first belt terminator receptor 202.

In this embodiment, the power switch 208 has a power switch body 210 with a post 212 which serves as a first switch advancing surface. The first belt terminator 200 has terminator prongs 214 which are configured to engage receptor tracks 216 along which the terminator prongs 214 advance when the first belt terminator 200 is placed into the first belt terminator receptor 202. A probe 218 having a probe surface 220 is positioned on one of the terminator prongs 214 such that the probe surface 220 engages the post 212 as the first belt terminator 200 is engaged with the first belt terminator receptor 202. As the probe surface 220 advances, it rotates the power switch body 210 about a power switch axis 222 and against the bias of a power switch torsion spring 224. This rotation of the power switch body 210 rotates a contact surface 240 on the power switch body 210 such that the contact surface 240 provides a conductive path between power contacts 246, completing a circuit 248 between the battery 204 and the transmitter and receiver assembly 206 and thus placing the power switch 208 in a power-on position.

To lockably engage the first belt terminator 200 with the first belt terminator receptor 202, a first terminator latch 250 is provided. The first terminator latch 250 is configured to slidably engage the first belt terminator 200 as it is advanced into the first belt terminator receptor 202. The first terminator latch 250 is mounted on a leaf spring 252 having a leaf spring fixed end 254 which is fixed with respect to the receptor tracts 216. The leaf spring 252 is configured to apply a bias to the first terminator latch 250 as it is advanced along the first belt terminator 200, this bias sufficing to promote engagement of the first terminator latch 250 when it is advanced over a first terminator latch groove 256 in the first belt terminator 200.

To release the first belt terminator 200, the first terminator latch 250 is disengaged from the first terminator latch groove 256 by a first terminator release tab 258. As shown in FIG. 3, the first terminator release tab 258 is mounted with respect to a case 260 so as to be pivotable about a tab axis 262. The first terminator release tab 258 is configured such that it resides flush in a bottom surface 264 of the case 260 when the first belt terminator 200 is lockably engaged and held in position by the engagement of the first terminator latch 250 with the first terminator latch groove 256. The first terminator release tab 258 is pivoted by the user about the tab axis 262 by lifting a tab lift end 266 (shown in FIG. 2). Lifting the tab lift end 266 causes a tab spring engaging end 270 to be depressed, depressing the leaf spring 252 so as to remove the first terminator latch 250 from engagement with the first terminator latch groove 256. The disengagement of the first terminator latch 250 from the first terminator latch groove 256 allows the first belt terminator 200 to be withdrawn from the first belt terminator receptor 202. When the first belt terminator 200 is withdrawn, the power switch torsion spring 224 is free to rotate the contact surface 240 out of contact with the power contacts 246, thus breaking the circuit 248 and eliminating power to the transmitter and receiver assembly 206.

Figure 4:
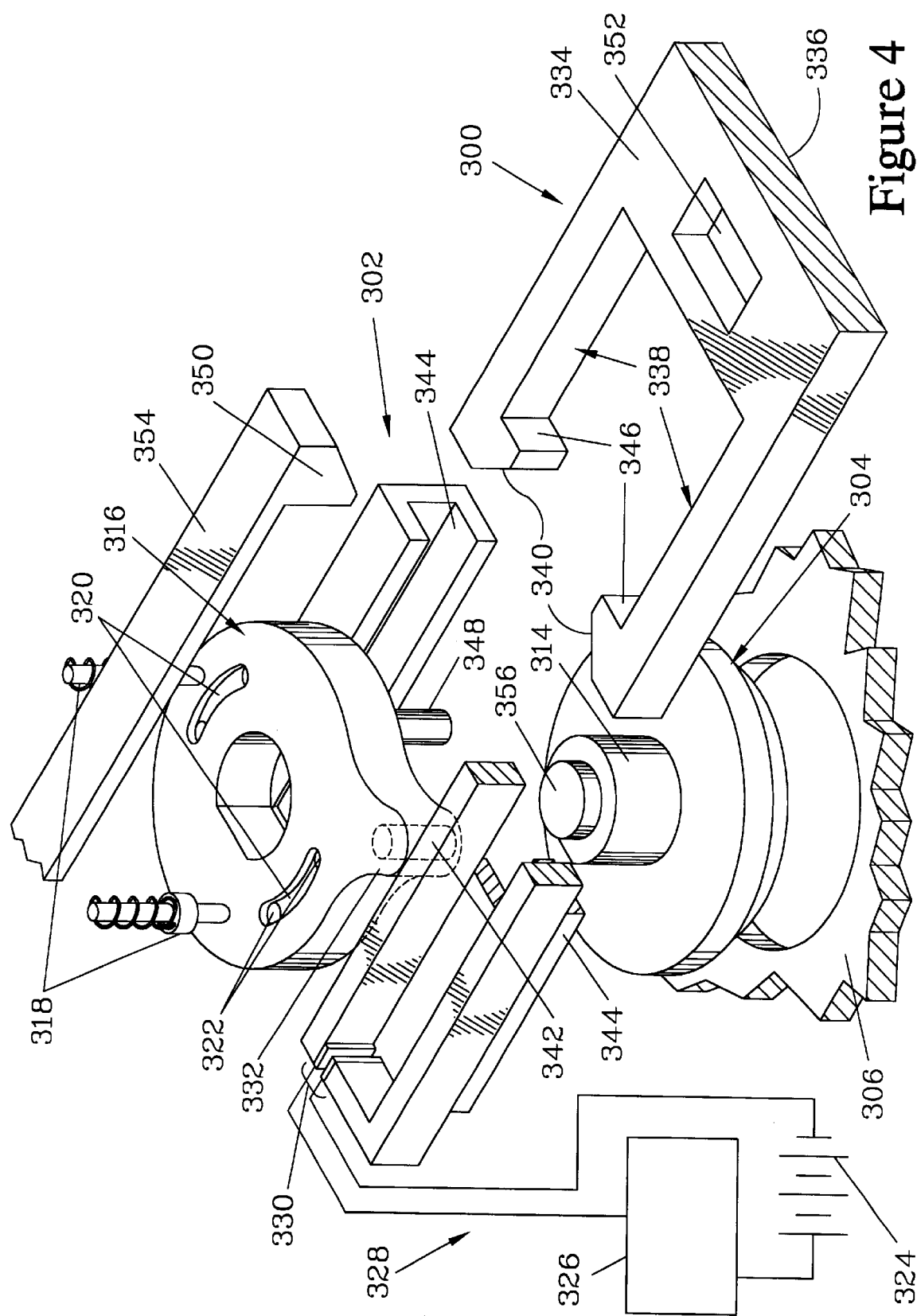
FIG. 4 is an exploded isometric view of another embodiment of a first belt terminator and an associated first belt terminator receptor, which differs from the embodiment illustrated in FIGS. 2 and 3 in that it allows the user to manually switch the power on and off.

FIG. 4 is an exploded isometric view of another embodiment of a first belt terminator 300 and an associated first belt terminator receptor 302. This embodiment differs from the embodiment illustrated in FIGS. 2 and 3 in that it provides a dual activated power on/off system that has the utility in rescue devices not encompassing all the remaining features set forth in the present application. The dual action power on/off system includes a rotatable switch plate 304 which is mounted in a surface 306 of a case 308 and preferably the bottom surface (best illustrated in FIG. 5). A first terminator tab 310 having a tab lift end 312 is pivotably mounted on the rotatable switch plate 304 such that, when the tab lift end 312 is lifted, the first terminator tab 310 provides a substantially vertical surface which can be used to manually rotate the rotatable switch plate 304 from a power-off position to a power-on position.

The rotatable switch plate 304 has a stem 314 which slidably but not rotatably engages a power switch body 316.

Followers 318 which are resiliently mounted with respect to the case 308 ride in switch tracks 320 which terminate in locking depressions 322, thus limiting rotation of the power switch body 316 and providing retention in two positions.

FIG. 4 illustrates the power switch body 316 in the power-off position. A battery 324 which serves as a power supply for a transmitter and receiver assembly 326 through a power circuit 328 is not able to deliver power, since a pair of power circuit contacts 330 are biassed to an open position.

Figure 6:
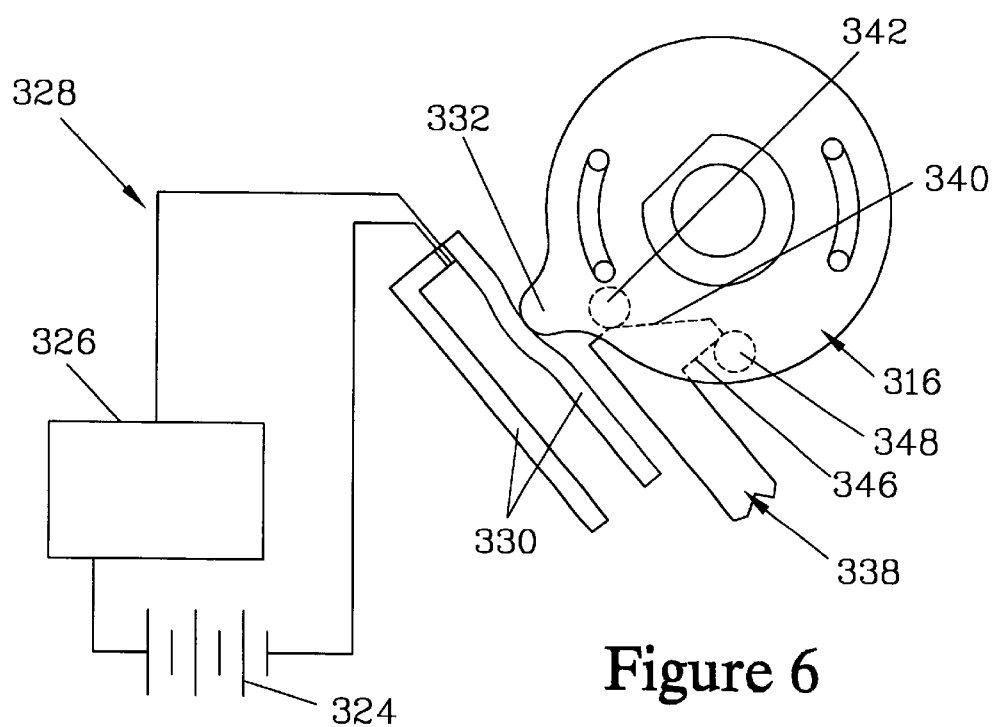
FIG. 6 is a detail view of the power switch of the embodiment shown in FIGS. 4 and 5.

FIG. 6 illustrates the power switch body 316 in the power-on position. In this position, the circuit contacts 330 are closed to complete the power circuit 328 and allow the battery 324 to power the transmitter and receiver assembly 326. The circuit contacts 330 are brought into contact with each other by a contact cam surface 332 mounted on the power switch body 316 as the rotatable switch plate 304 and the power switch body 316 are rotated from the power-off position to the power-on position.

The above described switch can be manually operated by using the first terminator tab 310 to rotate the rotatable switch plate 304, without requiring the first belt terminator 300 being inserted in the first belt terminator receptor 302.

While the rotatable switch plate 304 can be used to turn on or off the power to the transmitter and receiver assembly 326, the power is also controlled by the insertion of the first belt terminator 300 into the first belt terminator receptor 302 and the removal therefrom.

In the embodiment shown in FIG. 4, the first belt terminator 300 has a top side 334 and a bottom side 336 which are symmetrically designed such that the first belt terminator 300 is symmetric with respect to the top side 334 and the bottom side 336, allowing the first belt terminator 300 to be inserted into the first belt terminator receptor 302 with either the top side 334 up or the bottom side 336 up.

The first belt terminator 300 has a pair of probes 338 each having a probe engaging surface 340. Depending on the orientation of the first belt terminator 300, one of the probe engaging surfaces 340 is positioned to engage an advancing post 342 mounted on the power switch body 316 as the first belt terminator 300 is advanced along receptor tracks 344. The advancing post 342 serves as a first switch advancing surface. As the first belt terminator 300 continues to be inserted, the engagement of the probe engaging surface 340 with the advancing post 342 rotates the power switch body 316 from the power-off position to the power-on position.

It should be noted that, when the first belt terminator 300 is fully inserted into the first belt terminator receptor 302, the engagement of the advancing post 342 with the probe engaging surface 340 prevents the power switch body 316 from being rotated to the power-off position. This provides additional safety for the user, since it prevents the power from being accidentally turned off while the case 308 is connected to the user.

The pair of probes 338 also each have a power disengaging surface 346. Depending on the orientation of the first belt terminator 300, one of the power disengaging surfaces 346 is positioned to engage a return post 348 mounted in the power switch body 316 as the first belt terminator 300 is withdrawn from the first belt terminator receptor 302. The return post 348 serves as a first switch return surface. It should be noted that the rotation of the power switch body 316 to the power-on position rotates the return post 348 into a position where it is engaged by one of the power disengaging surfaces 346. Engagement of the return post 348 by one of the power disengaging surfaces 346 returns the switch body 316 and rotatable switch plate 304 to the power-off position as the first belt terminator 300 is withdrawn from the first belt terminator receptor 302.

To lockably engage the first belt terminator 300 in the first belt terminator receptor 302, a first terminator latch 350 is provided which is configured to slidably engage the first belt terminator 300 and lockably engage a first terminator latch groove 352. The first terminator latch 350 is mounted on a leaf spring 354 to allow the first terminator latch 350 to resiliently slide over the surface of the first belt terminator 300 and lockably engage the first terminator latch groove 352.

Figure 5:
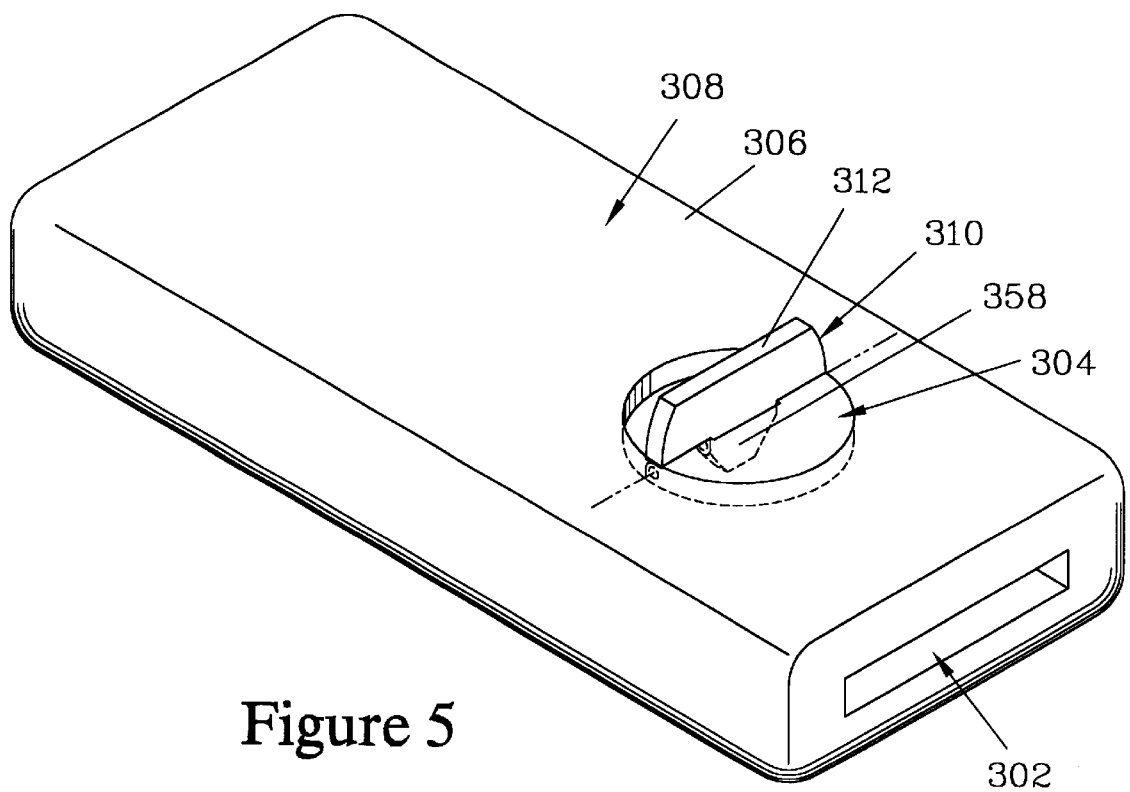
FIG. 5 is a view showing a first terminator release tab which may be grasped by the user to turn the rotatable switch plate shown in FIG. 4, as well as to release a first terminator latch.

To disengage the first terminator latch 350, a disengaging column 356 is provided which may be raised by a column cam surface 358 shown in FIG. 5 on the first terminator release tab 310 as the first terminator release tab 310 is pivoted away from the bottom surface 306 of the case 308. The disengaging column 356 engages the leaf spring 354 and raises it as the disengaging column 356 is raised, thus lifting the first terminator latch 350 from the first terminator latch groove 352.

Figure 7:
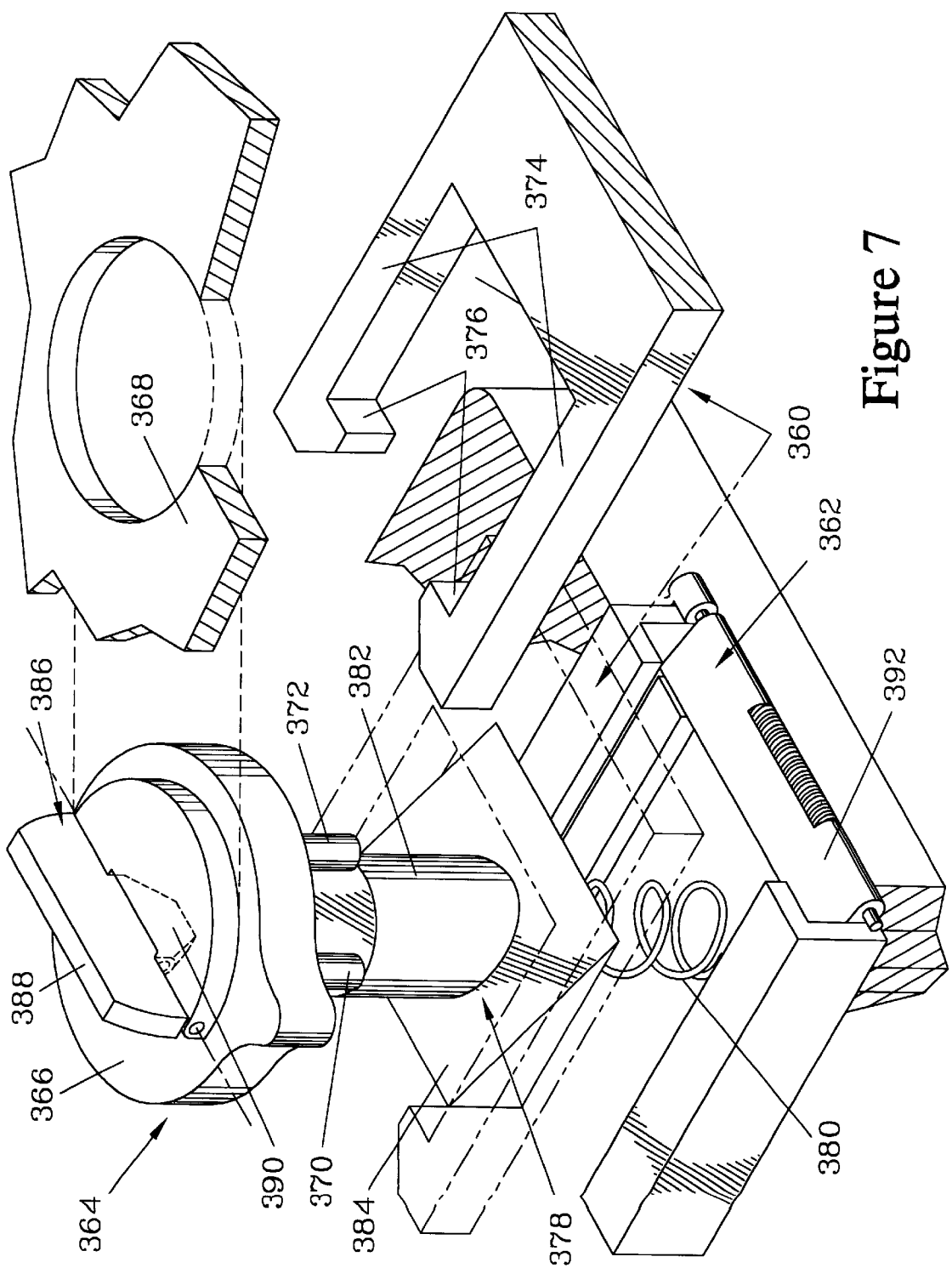
FIG. 7 is a partially exploded isometric view showing another embodiment of a first belt terminator and an associated first receptor, which function similarly to the embodiment shown in FIGS. 4–6, but which employ a simplified structure for locking the first belt terminator in the first receptor. This embodiment also employs a spring-loaded flap to cover the first receptor to prevent snow from entering. The latch assembly has a pair of locking catches which engage probes on the first belt terminator. A pivotably mounted first terminator tab serves to move the latch assembly to allow the probes to be withdrawn.

FIG. 7 is a partially exploded isometric view showing another embodiment of a first belt terminator 360 and an associated first terminator receptor 362, which function similarly to the embodiment shown in FIGS. 4–6, but which employ different structure to lockably engage the first belt terminator 360 in the first terminator receptor 362.

The first belt terminator 360 and the first terminator receptor 362 again serve to cooperatively activate a power switch 364, which has a power switch body 366 which is rotatably mounted with respect to a case 368. Again, the power switch body 366 has an advancing post 370 and a return post 372 which, when engaged by probes 374 on the first belt terminator 360, rotate the power switch body 366 to move the power switch 364 between its power-on and power-off positions.

The probes 374 of the first belt terminator 360 each have a probe catch surface 376 thereon. The probes 374 are preferably configured such that the probe catch surfaces 376 also serves as power disengaging surfaces, which are discussed in detail above.

In this embodiment, a spring-loaded latch assembly 378 is provided in the first terminator receptor 362 to lockably engage the first belt terminator 360. The latch assembly 378 is biased upwards by a latch spring 380 residing in a latch spring casing 382 which resiliently and rotatably engages the power switch body 366. The latch assembly 378 has a pair of locking catches 384 (only one of which is shown) which are engaged by the probes 374 when the first belt terminator 360 is placed into the first terminator receptor 362. The latch spring 380 biasses the locking catches 384 into a raised position where they engage the probe catch surfaces 376 of the probes 374.

To depress the latch assembly 378 to remove the first belt terminator 360 from the first terminator receptor 362, a first terminator tab 386 is pivotably mounted to the power switch body 366. The first terminator tab 386 has a tab lifting end 388 which, when raised by the user, pivots a tab depressor cam surface 390 downwards. The tab depressor cam surface 390 forcibly engages the latch spring casing 382 to move the latch assembly 378 against the bias of the latch spring 380 to a lowered position where the probes 374 may be withdrawn past the locking catches 384.

This embodiment also preferably employs a spring-loaded flap 392 which is pivotably mounted to the case 368. The spring-loaded flap 392 is biased to cover the first terminator receptor 362 when the first belt terminator 360 is removed therefrom, and thus serves to prevent snow and debris from entering the first terminator receptor 362

Figure 8:
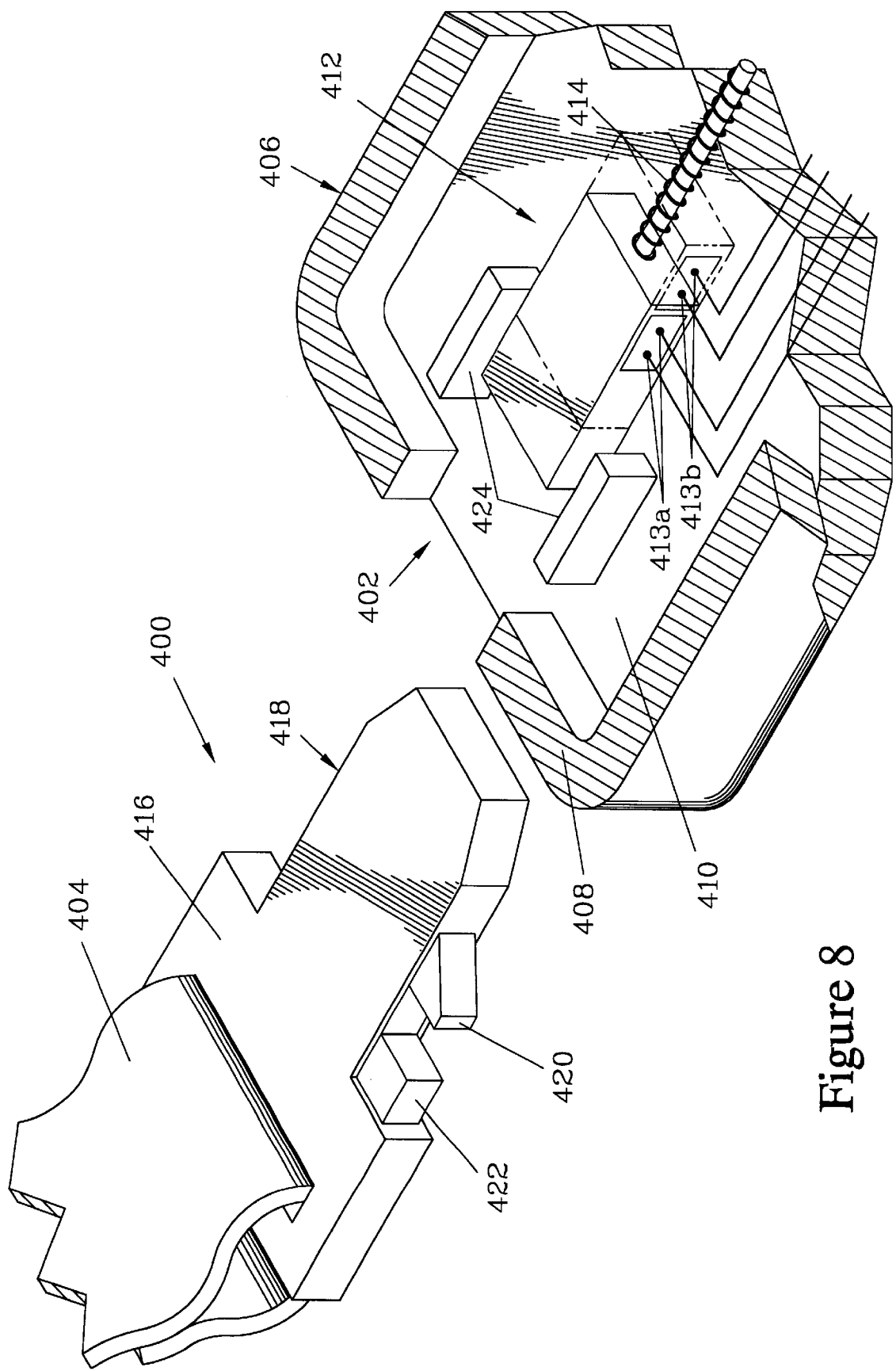
FIG. 8 is a an exploded isometric view illustrating a second belt terminator and an associated second belt terminator receptor which may be employed in the device shown in FIG. 1. A mode switch is biassed such that the device is in the receive mode when the second belt terminator is not engaged with the second belt terminator receptor. The second belt terminator has a terminator arm which is inserted into the second belt terminator receptor and which moves the mode switch to the transmit mode.

FIG. 8 is a rudimentary embodiment of a second belt terminator 400 and a second belt terminator receptor 402 which form an assembly serving to attach a belt 404 to a case 406 which houses a transmitter, a receiver and an antenna (not shown). This assembly also controls whether the transmitter is activated or the receiver is activated. In this embodiment, the second belt terminator receptor 402 is positioned at a second harness support end region 408 of the case 406 and is attached to a bottom surface 410 of the case 406.

The second belt terminator 400 interacts with the second belt terminator receptor 402 and a mode switch 412 which resides in the second belt terminator receptor 402. The mode switch 412 controls whether the rescue device is in the transmit mode or the receive mode by closing either a pair of receiver contacts 413a or a pair of transmitter contacts 413b. The mode switch 412 is biassed by a spring 414 such that the device is in the receive mode when the second belt terminator 400 is not engaged with the second belt terminator receptor 402.

The second belt terminator 400 has a terminator base 416, to which the belt 404 attaches, and a terminator arm 418, which is designed to be inserted into the second belt terminator receptor 402. The terminator arm 418 is provided with a second terminator latch 420 for lockably engaging the second belt terminator 400 with the second belt terminator receptor 402 when it is fully inserted therein. A latch release button 422 is provided to disengage the second terminator latch 420. Guide surfaces 424 are provided internal to the second belt terminator receptor 402 and serve to direct the terminator arm 418 toward the mode switch 412. As the terminator arm 418 is advanced, it engages and moves the mode switch 412, compressing the spring 414 and toggling the mode switch 412 to the transmit mode. At this position, the second terminator latch 420 engages the second belt terminator receptor 402 to secure the belt 404 to the case 406 and assure that the rescue device remains in the transmit mode until an affirmative action is taken to disconnect the belt 404.

Figure 9:
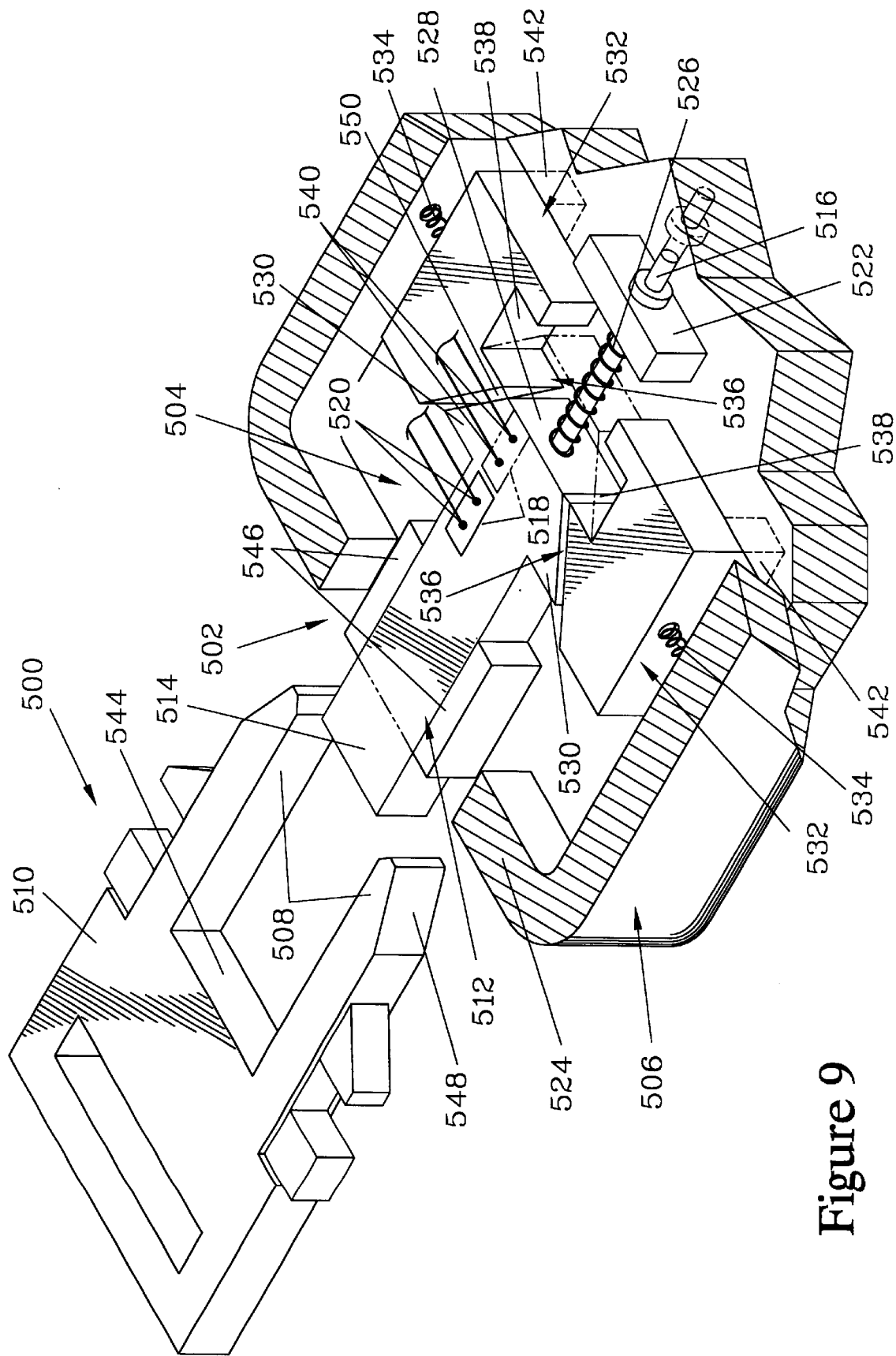
FIG. 9 is a partially exploded isometric view of a second belt terminator and a second belt terminator receptor which may be employed in the device shown in FIG. 1 to allow the rescue device to be placed in the transmit mode either by inserting the second belt terminator into the second belt terminator receptor or by manually operating a mode switch.

While the embodiment of FIG. 8 assures that the device is in the transmit mode when the second belt terminator 400 is connected to the case 406, which is typically the situation when a party is likely to be buried by an avalanche, there is also the possibility that the searcher could be buried in a secondary avalanche while searching for a buried party. If this occurs, the buried searcher may be restricted in motion, and thus unable to reconnect the second belt terminator 400 with the second belt terminator receptor 402 to return the rescue device to the transmit mode. Thus, for increased safety, it is preferred to have a secondary means for placing the rescue device in the transmit mode. FIG. 9 illustrates an improved rescue device which has the important feature of a secondary quick-acting supplemental means for toggling the rescue device to the transmit mode. This embodiment thus provides a dual-action mode toggle system which has utility independent of its use in the rescue device of the present invention.

FIG. 9 is a partially exploded isometric view of a second belt terminator 500 which is designed to be used in combination with a second belt terminator receptor 502 which allows the rescue device to be placed in the transmit mode either by inserting the second belt terminator 500 into the second belt terminator receptor 502 or, alternatively, by depressing a mode switch 504 which extends beyond a case 506 which encloses a transmitter, a receiver, and an antenna of a rescue device. In this embodiment, the second belt terminator receptor 502 is an integral part of the case 506. The second belt terminator 500 has a pair of terminator arms 508 which extend from a terminator base 510.

The mode switch 504 has a mode switch body 512 and terminates in a switch head 514 and a switch shank 516. The mode switch body 512 is translatably mounted in the second belt terminator receptor 502 such that the switch head 514 is exposed extending beyond the case 506 when the mode switch 504 is in a receive mode position. In the receive mode position, the mode switch 504 places a contact surface 518 on the mode switch body 512 in position to close receiver contacts 520. The switch shank 516 is slidably mounted in a shank bracket 522, which in turn is secured with respect to the case 506 to assure that the translational motion of the mode switch body 512 is substantially normal to a second case end section 524. The mode switch body 512 is biassed to the receive mode position by a shank spring 526 which compressively engages the shank bracket 522 and a spring rest 528 on the mode switch body 512.

The mode switch body 512 is provided with at least one switch body catch 530, and more preferably a pair of switch body catches 530 are provided. In the embodiment illustrated in FIG. 9, a pair of switch body catches 530 are employed which are symmetrically disposed on the mode switch body 512. Each of the switch body catches 530 engages a catch retainer 532 which is slidably mounted to the case 506 and is biassed toward the mode switch body 512 by a catch retainer spring 534. Each catch retainer 532 has a catch engaging surface 536, which in turn contains a catch receptor 538 therein.

When a searcher is using the rescue device in the receiver mode to conduct a search, the second belt terminator 500 is typically disengaged from the search device. If the searcher is buried by a secondary avalanche while searching, then the searcher can, with minimum motion, depress the switch head 514 until it is substantially flush with the case 506, as shown in phantom, which causes the pair of catches 530 to slide along the catch engaging surfaces 536 of the corresponding catch retainer 532. This motion also moves the contact surface 518 away from the receiver contacts 520, disabling the receiver, and advancing the contact surface 518 so as to engage transmitter contacts 540 to place the rescue device in the transmit mode.

When the mode switch body 512 is so depressed, each of the pair of switch body catches 530 engages the corresponding catch receptor 538, which maintains the mode switch body 512 in the receiver mode until an affirmative action is taken by the searcher to restore the rescue device to a transmit mode. This affirmative action can be the reinsertion and subsequent removal of the second belt terminator 500, which results in the mode switch body 512 returning to the transmit mode. However, the embodiment of FIG. 9 provides an alternative mechanism to return the rescue device to the receive mode which is not dependent on the availability of the harness assembly which contains the second belt terminator 500. In this case, returning to the receive mode can be accomplished by pushing spreading tabs 542 provided on the catch retainers 532, thus moving the catch receptors 538 away from engagement with their respective switch body catches 530.

In this embodiment, the contact surface 518 is so positioned as to assure engagement with the transmitter contacts 540 before such time as the paired switch body catches 530 lockably engage the catch receptors 538. The transmit mode of operation may be activated by the second belt terminator 500, which has a switch head engaging surface 544, when the switch head engaging surface 544 depresses the switch head 514 as the terminator arms 508 are advanced along guide surfaces 546. The terminator arms 508 have catch retaining spreader surfaces 548 which slidably engage mating catch retainer spreading surfaces 550 to assure that the paired switch body catches 530 are not lockably engaged by the catch receptors 538. This assures that the mode switch body 512 will return to the receive mode when the second belt terminator 500 is removed from the second belt terminator receptor 502.

Figure 10:
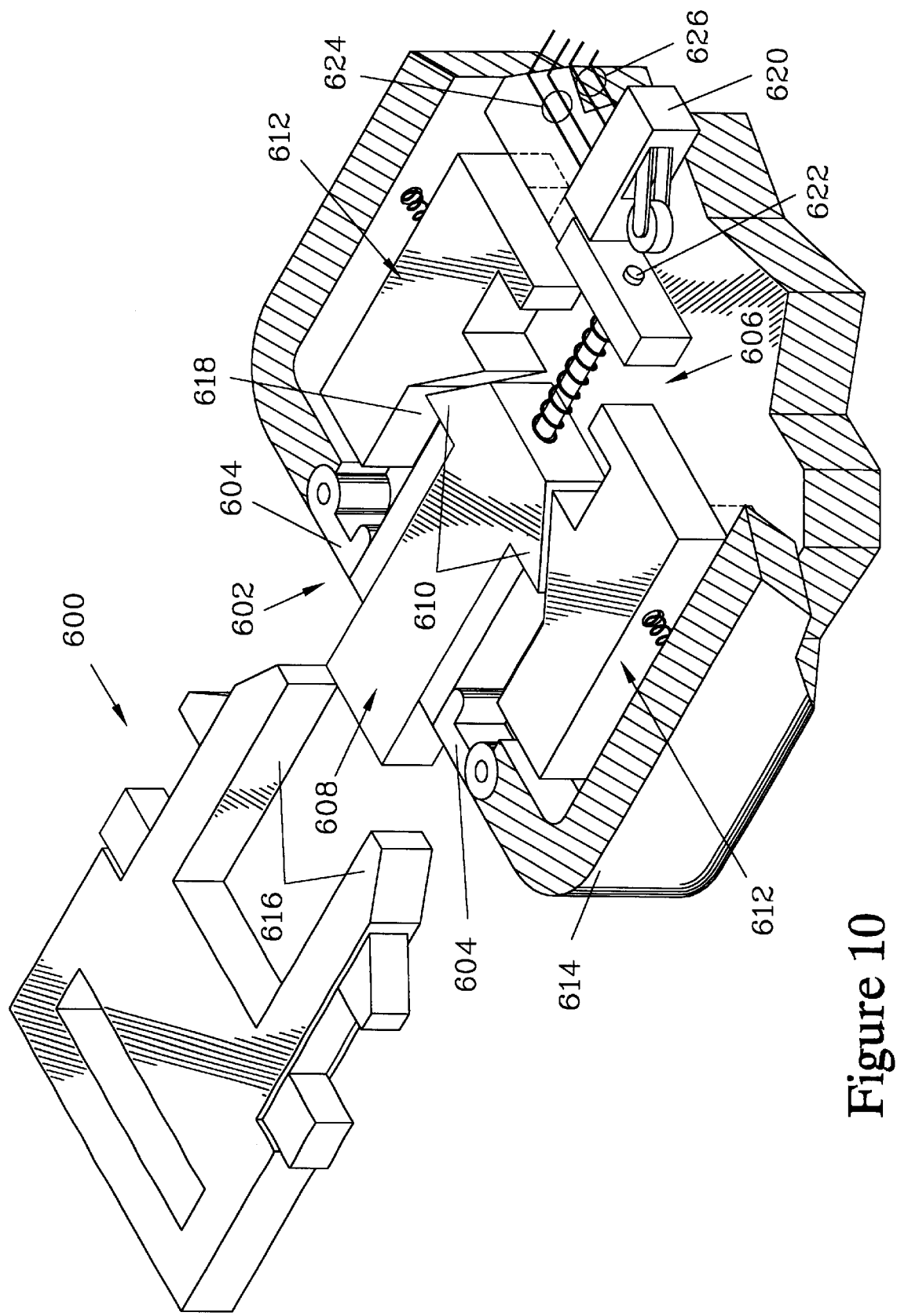
FIG. 10 is a partially exploded view showing an alternative second belt terminator and associated second belt terminator receptor which function similarly to those shown in FIG. 9. In this embodiment, spring-loaded flaps are provided to cover the second belt terminator receptor.
Figure 11:
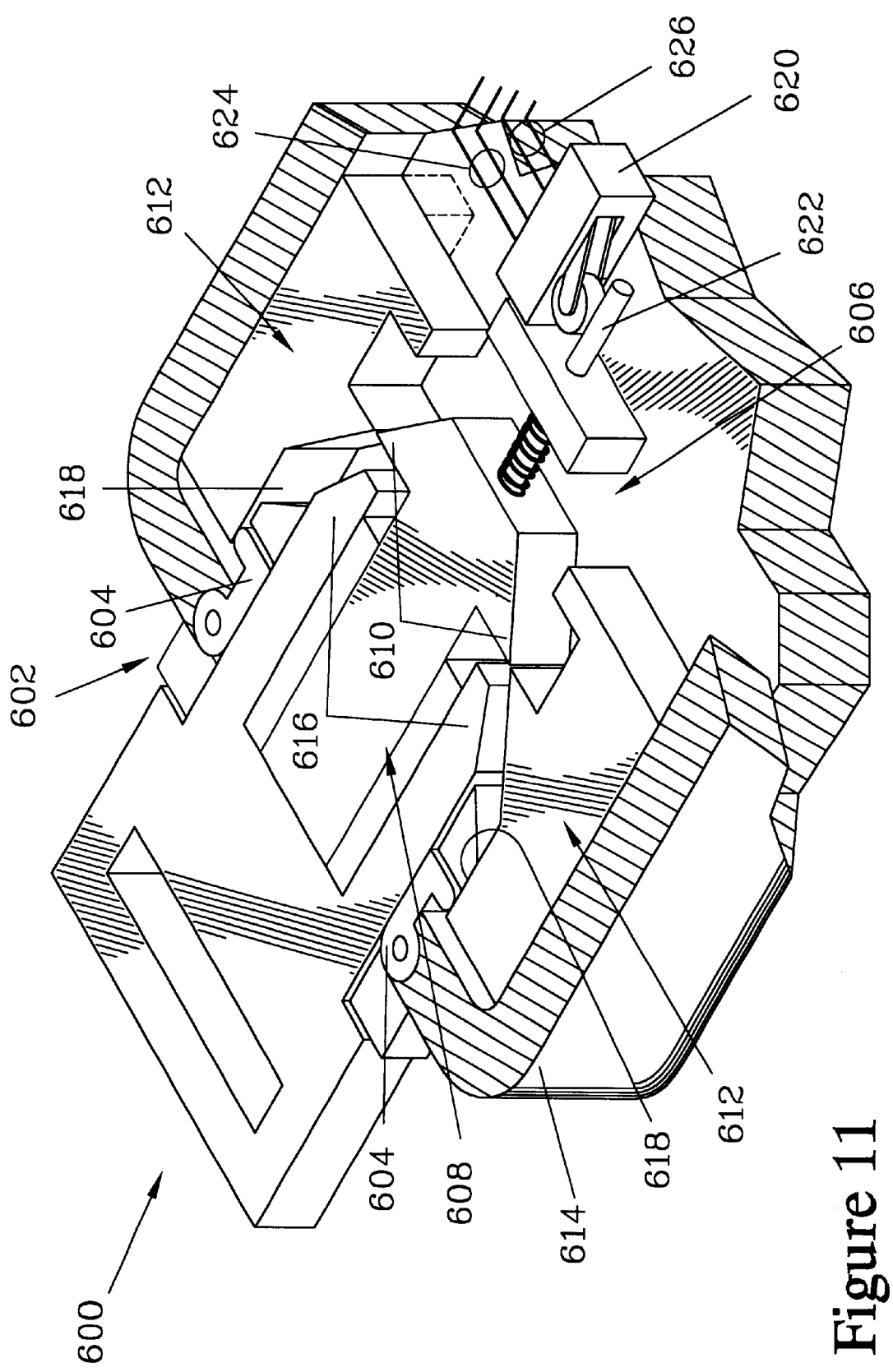
FIG. 11 is a view showing the second belt terminator and second belt terminator receptor of FIG. 10 where the second belt terminator has been inserted into the second belt terminator receptor.

FIGS. 10 and 11 illustrate an alternative second belt terminator 600 and an associated second belt terminator receptor 602 which function similarly to the second belt terminator 500 and second belt terminator receptor 502 discussed above. In this embodiment, spring-loaded flaps 604 are employed to cover the second belt terminator receptor 602 when the second belt terminator 600 is removed therefrom, as is shown in FIG. 10.

The second belt terminator 600 and the second belt terminator receptor 602 are again interactive with a mode switch 606 having a mode switch body 608. The mode switch body 608 is again provided with switch body catches 610, and catch retainers 612 are slidably mounted to a case 614.

In this embodiment, the second belt terminator 600 has two terminator arms 616 which forcibly engage the spring-loaded flaps 604 as the second belt terminator 600 is inserted into the second belt terminator receptor 602. This engagement forces the spring loaded flaps 604 to engage catch retainer spreading surfaces 618 on each of the catch retainers 612, moving the catch retainers 612 away from engagement with the switch body catches 610, as shown in FIG. 11.

This embodiment also differs in the type of switch contact arrangement used to toggle the mode of operation. In this embodiment, a roller switch 620 is employed. As a shank 622 is advanced by the mode switch body 608, the roller switch 620 is contacted by the shank 622 which, as it advances, changes the switch 620 from closing a first set of contacts 624 to closing a second set of contacts 626.

Figure 12:
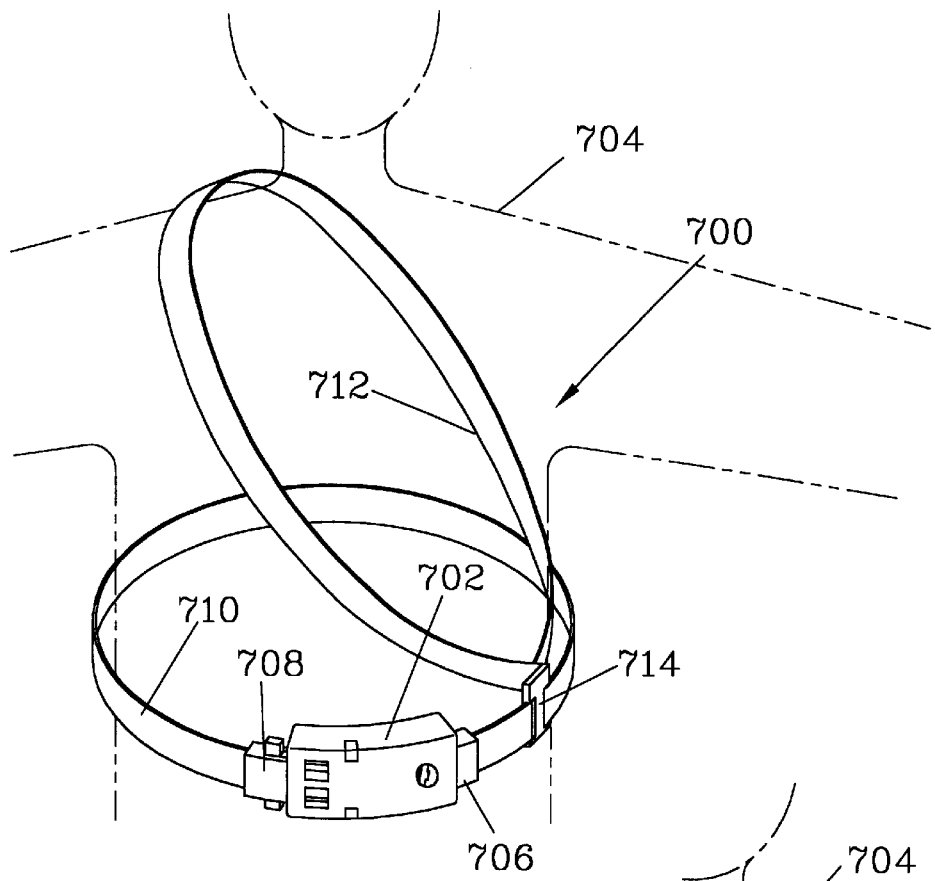
FIG. 12 is an isometric view showing another improved rescue device which employs a preferred harness arrangement for attaching a case to the user. Again, the case is attached via a first belt terminator, which controls the power to the device, and a second belt terminator which toggles the device between a transmit mode and a receive mode. The device has both a waist belt and a shoulder belt, which are connected together.
Figure 13:
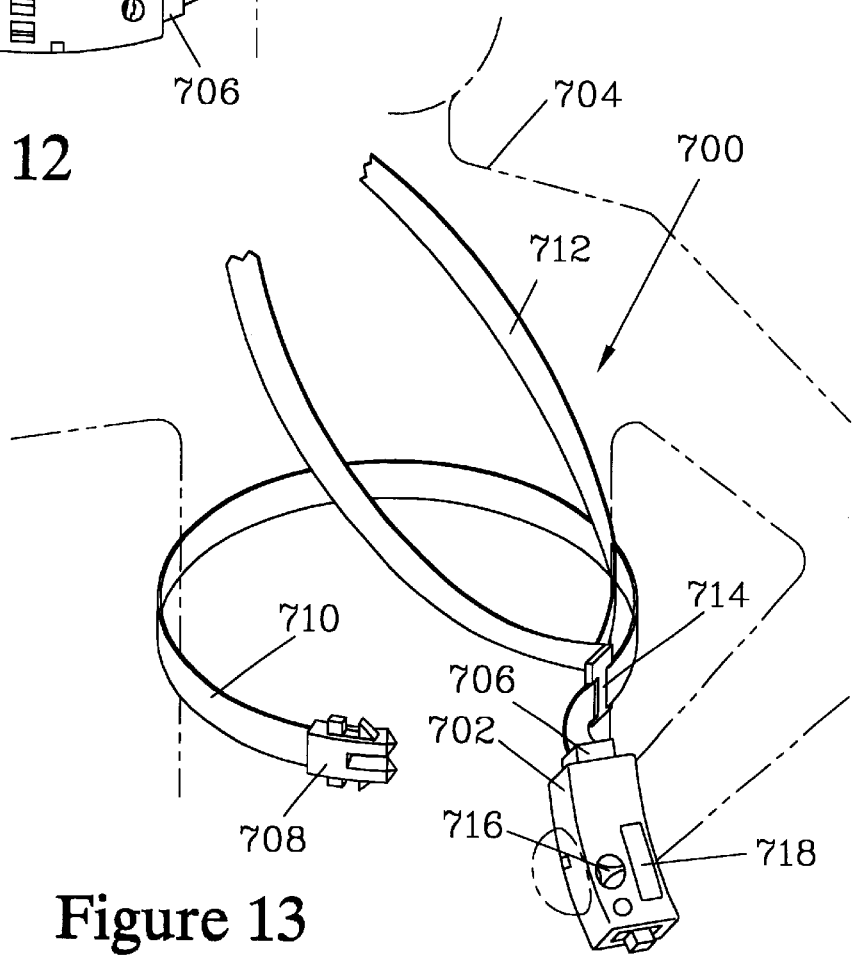
FIG. 13 shows the rescue device of FIG. 12 where the second belt terminator has been detached from the case, in order to switch the device from the transmit mode to the receive mode. The shoulder strap continues to attach the case to the user while allowing the user to readily hold the case to operate the device to conduct a search.

FIGS. 12 and 13 illustrate an improved rescue device 700 which is similar to the rescue device 100 shown in FIG. 1, and which employs a preferred harness arrangement for attaching a case 702 to a user 704 (shown in phantom). The case 702 is attached via a first belt terminator 706 and a second belt terminator 708. As discussed above, attachment of the first belt terminator 706 to the case 702 controls the power to the device 700, while attachment of the second belt terminator 708 to the case 702 toggles the device 700 between a transmit mode and a receive mode. The device 700 has both a waist belt 710 and a shoulder belt 712. The waist belt 710 is connected to both the first belt terminator 706 and the second belt terminator 708, and passes around the waist of the user 704 to maintain the case 702 in close proximity to the user 704, as shown in FIG. 12. The shoulder belt 712 is connected to the waist belt 710 by a harness connector 714 which slidably engages the waist belt 710. The shoulder belt 712 passes over the shoulder of the user 704.

As discussed above, when the first belt terminator 706 and the second belt terminator 708 are both attached to the case 702, the device 700 is powered in the transmit mode. When the user 704 desires to conduct a search, the second belt terminator 708 is detached from the case 702 as shown in FIG. 13, which places the device 700 in the receive mode.

The first belt terminator 706 remains attached to the case 702, assuring that the power to the device 700 is on. The first belt terminator 706 also maintains the case 702 connected to the user by the waist strap 710 and the shoulder strap 712, preventing accidental loss of the device 700. The shoulder strap 712 is connected to the waist belt 710 via the harness connector 714 so as to provide a sufficient length of the waist belt 710 to allow the user 704 to hold the case 702 in a position where a dial 716 can be readily manipulated and a display 718 can be readily seen. Such a position facilitates the user 704 operating the device 700 to conduct a search.

The device 700 is particularly useful in situations where multiple searchers are present. All searchers must have their rescue devices switched to the receive mode to begin searching, to prevent stray transmissions from interfering with the signal transmitted by the buried party. Since the device 700 is detached from engagement around the waist of the user 704 when switched to the receive mode, searchers can readily visually determine whether the device 700 has been so switched. This feature allows easier coordination between multiple searchers, allowing the search to be conducted with decreased delay.

Figure 14:
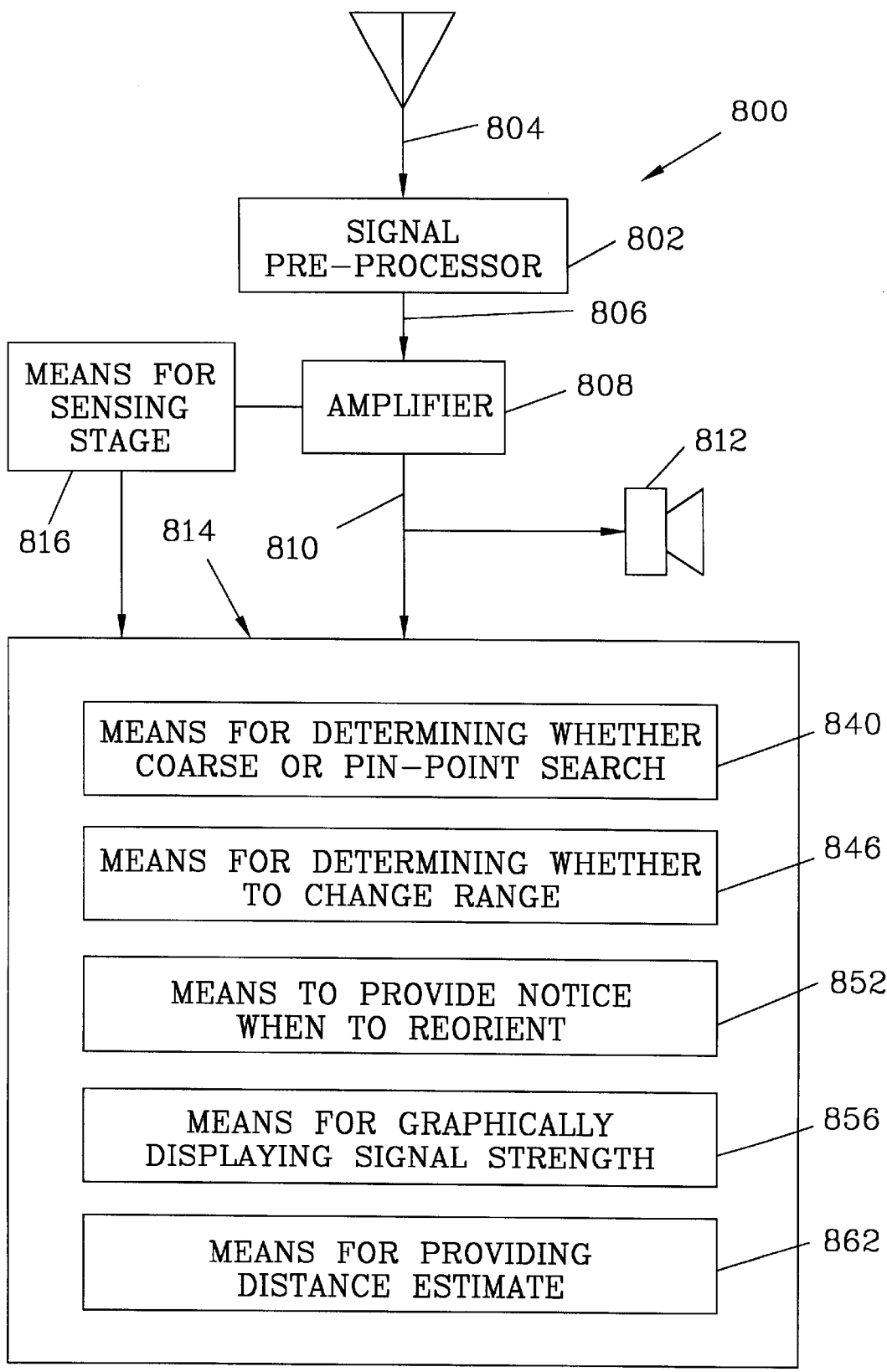
FIG. 14 is a schematic illustration of an on-board rescue analysis system of the present invention. The rescue analysis system receives a signal and processes it using a multistage amplifier. The rescue analysis system has a sub-system for operating on the processed signal to provide direction to the user in conducting a search.

FIG. 14 illustrates an on-board rescue analysis system 800 of the present invention. The rescue analysis system 800 has a signal pre-processor 802 which receives an antenna signal 804. The antenna signal 804 is generated by the transmitter of the buried party and is a 457 kHz modulated signal. The signal pre-processor 802 converts the antenna signal 804 to a pre-processed signal 806 which is preferably a demodulated 2 kHz signal. The signal pre-processor 802 may amplify the antenna signal 804 in addition to demodulating it.

The pre-processed signal 806 is fed to a manually operated multistage amplifier 808, having N stages, which generates a working signal 810. The working signal 810 is fed to a speaker 812 and to a signal processing system 814. Means for sensing the stage at which the multistage amplifier 808 is operating 816 are also provided, which report the stage of the multistage amplifier 808 to the signal processing system 814.

The signal processing system 814 employs the working signal 810 in combination with the information on the stage of the multistage amplifier 808 to provide prompts for the rescuing party as to how to proceed with the search. The signal processing system 814 may first condition the working signal 810 using components such as a rectifier, A-D converter, etc., to convert the working signal 810 to a format compatible with the signal processing system 814. Preferably, a LCD screen is employed to display the prompts. These prompts are prefereably icons that are designed to be suggestive to the searching party as to what action should be taken.

The signal processing system 814 is provided with a means for determining whether a coarse search or a pinpoint search should be conducted 840. This means uses either the working signal 810 and an index for the stage at which the amplifier 808 is operating, or uses the pre-processed signal 806 in combination with means for establishing whether the pre-processed signal 806 corresponds to a signal from a transmitter located at more than about 80 m or less than about 1 m. If the level of the signal (810 or 806) is such as to indicate that the transmitter is located more than about 80 m away, a coarse search icon is displayed, while if the transmitter is located less than about 1 m away, a pin-point search icon is displayed. FIGS. 15 and 16 respectively illustrate preferred graphic symbols for a coarse search icon 842 and a pin-point search icon 844.

The signal processing system 814 also has a means for determining whether there is a need to change the stage of the amplifier and provide notice of such 846. This means most conveniently uses the working signal 810 and provides a scale up icon 848 (see FIG. 17) or a scale down icon 850 (see FIG. 18) as the limits of the current stage of the multistage amplifier are reached. The scale up icon 848 is displayed when the lower limit of the stage is reached, prompting the searcher to switch to a stage having greater amplification, while the scale down icon 850 is displayed when the upper limit of the stage is reached. The icons (848 and 850) respectively illustrated in FIGS. 17 and 18 are preferred icons which are felt to suggest the action to be taken by the searcher.

Since it is important for the search to advance in a systematic manner, the searcher should proceed along a field line. In order to assist in maintaining the search on a field line, the signal processing system 814 is provided with means to provide notice when the rescue device should be reoriented with respect to the field line 852 and provides a reorient icon 854 as illustrated in FIG. 19.

The signal processing system 814 also preferably has means for graphically displaying the working signal's relative strength 856. This means preferably generates a bar graph 858, which is more preferably framed by an arrow icon 860 as shown in FIGS. 16, 18, and 19.

It is further preferred that means for analyzing one of the signals generated by the receiver and converting the strength of the signal to an estimated distance along field line to the buried transmitter 862 be provided. This means generates a digital distance indication 864 such as is illustrated in FIGS. 16 and 18.

Preferably, means are provided for temporarily displaying all of the icons (842, 844, 848, 850, 854, 858, 860, and 864) when power is initially provided to the rescue analysis system 800, to provide notice to the user that all icons are functioning properly.

Preferably, a battery level checking means is provided, with an associated battery strength indicator to indicate to the user the remaining battery life. This means is activated when the device is first placed in the transmit mode so that the user will be placed on notice as to the battery condition before being placed in a situation where the user must rely on the performance of the device.

All of the above described means can be implemented in either circuitry or with a microprocessor. An example of a microprocessor-based signal processing system follows.

Figure 20:
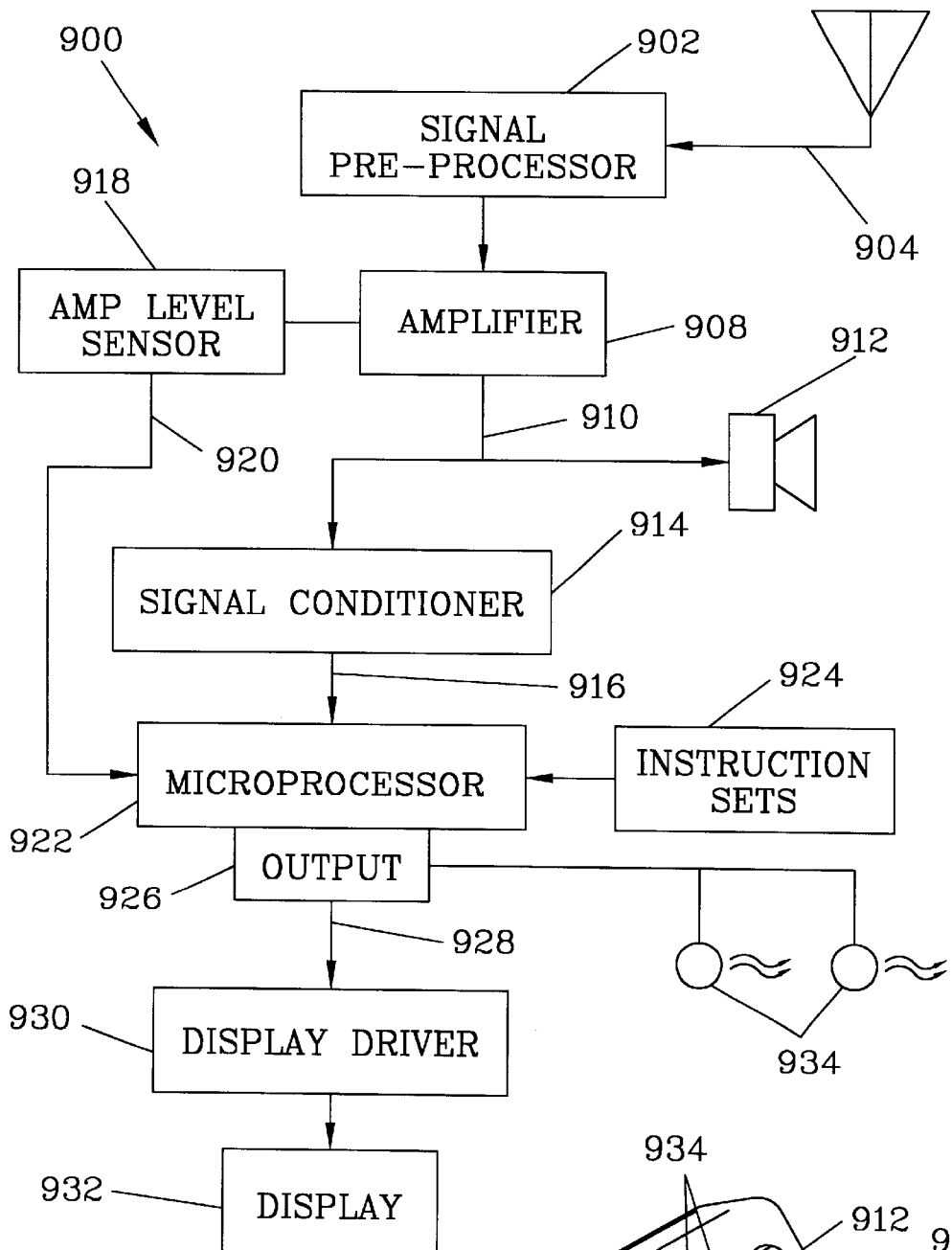
FIG. 20 is a schematic illustration of one embodiment of an on-board rescue analysis system of the present invention. The rescue analysis system receives a signal and processes it using a multistage amplifier. The processed signal is provided to a microprocessor, and an amplifier level sensor provides a stage level signal to the microprocessor which indicates which stage of the amplifier is selected. The microprocessor operates on the processed signal and the stage level signal and directs a display driver which drives a display to prompt the user to take appropriate search actions.

FIG. 20 illustrates an on-board rescue analysis system 900 of the present invention. The rescue analysis system 900 has a signal pre-processor 902 which receives an antenna signal 904. The antenna signal 904 is generated by the transmitter of the buried party. Currently, the antenna signal 904 is a 457 kHz modulated signal. The signal pre-processor 902 converts the antenna signal 904 to a pre-processed signal 906 which is a demodulated 2 kHz signal.

The pre-processed signal 906 is fed to a manually operated multistage amplifier 908, having N stages, which generates an amplified working signal 910. The working signal 910 is fed to a speaker 912.

The working signal 910 is also fed to a signal conditioner 914. The signal conditioner 914 in turn generates a microprocessor input signal 916. An amplifier level sensor 918 monitors the stage in which the multistage amplifier 908 is operating and provides a machine-readable stage level signal 920 which indicates the level of the stage at which the multistage amplifier 908 is operating.

A microprocessor 922, in combination with instruction sets 924, operates on the microprocessor input signals 916 and the stage level signal 920 to provide microprocessor output 926, which contains processed data for subsequent display as well as routing instructions to direct such to the appropriate display. In all cases, display signals 928 from the microprocessor output 926 are directed to a display driver 930 which drives a display 932. Preferably, the microprocessor 922 also directs the microprocessor output 926 to display lights 934.

Figure 21:
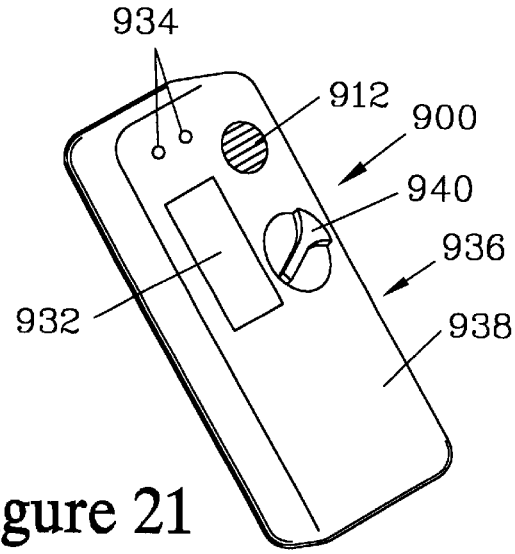
FIG. 21 is an isometric view which illustrates the on-board rescue analysis system shown in FIG. 20 housed in a case, where the display is a liquid crystal display mounted in a front face of the case. The speaker and a dial for manually operating the multistage amplifier are also mounted in the front face.

FIG. 21 illustrates the on-board rescue analysis system 900 housed in a case 936 which also houses an antenna, a transmitter, and a receiver in a manner similar to the case 102 shown in FIG. 1. The display 932 is preferably a liquid crystal display and is mounted in a top surface 938 of the case 936. Any display lights 934 are also mounted in the front face 938, and it is preferred for the front face 938 to be employed to mount the speaker 912 and a dial 940 for manually operating the multistage amplifier 908.

Figure 22:
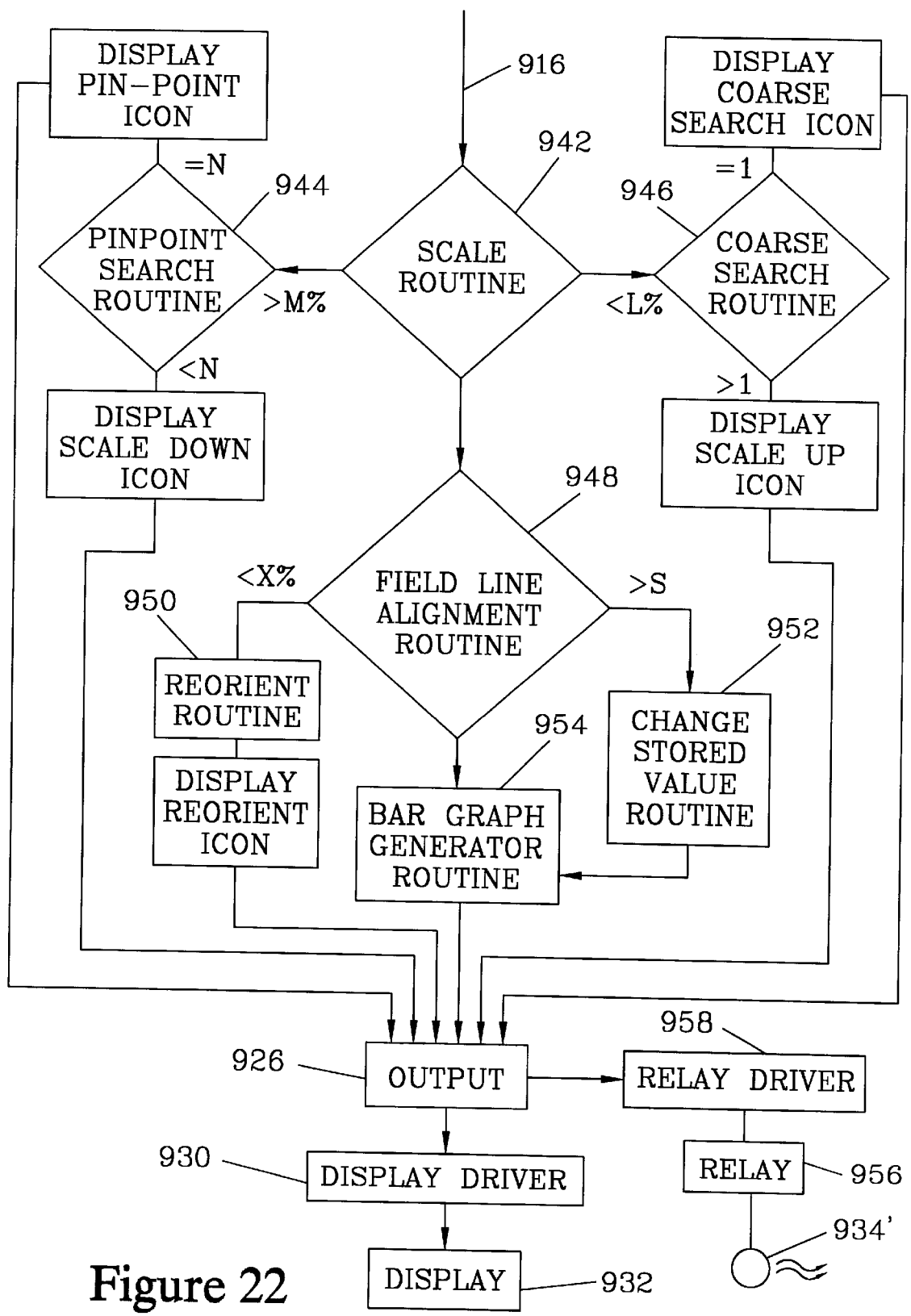
FIG. 22 is a flow diagram illustrating the operation of the rescue analysis system shown in FIG. 20. The microprocessor has instruction sets for several routines, which direct the display driver to generate and send icons to the display according to certain conditions of the processed signal strength and the stage of the multistage amplifier which is selected.

FIG. 22 illustrates a flow diagram illustrating one example of how the various instruction sets 924 are sequentially implemented. The instruction sets 924 include a scale routine 942, a pin-point search routine 944, a coarse search routine 946, a field line alignment routine 948, a reorient routine 950, a change stored value routine 952, and a bar graph generator routine 954.

The microprocessor input signal 916 is operated on by the scale routine 942. The scale routine 942 contains an instruction set that directs the microprocessor 922 to compare the microprocessor input signal 916 with a scale range SR. The scale range SR is the range between a scale maximum value, which is the saturation level for the speaker 912, and a scale minimum value, which is the minimum level which produces an audible sound from the speaker 912.

If the microprocessor input signal 916 is greater than M % of the scale range SR, then control of the microprocessor 922 is passed to the pin-point search routine 944. The pin-point search routine 944 reads the value of the stage level signal 920 and, if the stage level signal 920 is equal to N, indicating that the shortest range (least sensitive) stage is selected, the pin-point search routine 944 directs the display driver 930 to generate a pin-point search icon and send the pin-point search icon to the display 932. If the value of the stage level signal 920 is less than N, then the pin-point search routine 944 directs the display driver 930 to generate a change scale icon (preferably change scale down icon) and send it to the display 932.

If the microprocessor input signal 916 is less than L % of the scale range SR, then the control of the microprocessor 922 is passed to the coarse search routine 946. The coarse search routine 946 reads the value of the stage level signal 920 and, if the stage level signal 920 is 1, indicating that the longest range (most sensitive) stage is selected, the coarse search routine 946 directs the display driver 930 to generate a coarse search icon and send the coarse search icon to the display 932. If the value of the stage level signal 920 is greater than 1, then the coarse search routine 946 directs the display driver 930 to generate a change scale icon (preferably change scale up icon) and send it to the display 932.

If neither of the above conditions are met, then the microprocessor input signal 916 is passed to the field line alignment routine 948. The field line alignment routine 948 stores a stored value S, which is initially selected as an initial value of the microprocessor input signal 916. This stored value S is maintained for a fixed period of time δt, after which it may be replaced by the current value of the microprocessor input signal 916 as discussed below. The field alignment routine 848 compares the microprocessor input signal 916 against the stored value S. If the current value is less than S by X %, then control is passed to the reorient routine 950 which directs the display driver 930 to generate a reorient icon and send it to the display 932. In addition to display of the reorient icon, or as an alternative thereto, the reorient routine 950 may direct the display driver 930 to cease display of any other icons when the current value of the microprocessor input signal 916 is less than S by X %.

If the microprocessor input signal 916 is greater than S, then the control is transferred to the change stored value routine 952, which replaces S with the current value of the microprocessor input signal 916, and the microprocessor input signal 916 is sent to a bar graph generator routine 954 which directs the display driver 930 to generate a bar graph and send it to the display 932.

In the event that the signal control is not transferred as discussed above, then the microprocessor input signal 916 is sent to the bar graph generator routine 954 which directs the display driver 930 to generate a bar graph and send it to the display 932.

In all cases where the display driver 930 is directed to generate an icon for display, if a corresponding display light 934 is provided, the appropriate routine also causes such display light 934 to be activated. As an example of how such may be achieved, FIG. 22 shows a display light 934' which is controlled by the reorient routine 950. The display light 934' is energized via a relay 956 which is normally open. When the current value of the microprocessor input signal 916 is less than S by X %, the reorient routine 950 directs a relay driver 958 to close the relay 956 to energize the display light 934'.

While the novel features of the present invention have been described in terms of particular embodiments and preferred applications, it should be appreciated by one skilled in the art that substitution of materials and modification of details obviously can be made without departing from the spirit of the invention.

What I claim is:

1. An improved rescue device to be worn by an individual when in snow-covered regions subject to avalanche conditions, the rescue device having,
    a transmitter which generates a pulsed electromagnetic signal at a specified frequency,
    an antenna for transmitting the pulsed electromagnetic signal to provide a locating signal and for receiving signals from other transmitters,
    a receiver tuned to receive the locating signal from another transmitter via the antenna and generating an input signal proportional to the strength of the locating signal received,
    a speaker,
    a case for housing the transmitter, the antenna, and the receiver,
    a harness constructed from belts for securing the case to the individual,
    a first belt connector for attaching the harness to the case, and
    a second belt connector for attaching the harness to the case,
    the improvement comprising:
        a first belt terminator which serves as the first belt connector;
        a first belt terminator receptor which forms part of the case and which is configured to lockably engage said first belt terminator;
        a power switch associated with said first belt terminator receptor, said power switch having a power on position and a power off position;
        means for switching said power switch from said power on position to said power off position responsive to the engagement and disengagement of said first belt terminator with said first belt terminator receptor;
        means for locking and releasing said first belt terminator to and from said first belt terminator receptor;
        a second belt terminator which serves as the second belt connector;
        a second belt terminator receptor which forms part of the case and which is configured to lockably engage said second belt terminator;
        a mode switch associated with said second belt terminator receptor, said mode switch having a transmit mode position and a receive mode position;
        means for toggling said mode switch between said transmit mode position and said receive mode position responsive to the engagement and disengagement of said second belt terminator with said second belt terminator receptor; and
        means for locking and releasing said second belt terminator to and from said second belt terminator receptor.

2. The improved rescue system of claim 1 wherein said power switch further comprises:
    a power switch body having a first switch advancing surface;
    further wherein said means for switching said power switch further comprises:
        a probe engaging surface for contacting and advancing said first switch advancing surface so as to advance said power switch body to said power on position as said first belt terminator is inserted into said first belt terminator receptor; and
        means for returning said power switch body to said power off position when said first belt terminator is withdrawn from said first belt terminator receptor; and
    further wherein said means for locking and releasing said first belt terminator further comprises;
        a first terminator latch biassed to lockably engage said first belt terminator when said first belt terminator is inserted into said first belt terminator receptor; and
        an activating tab for releasing said first belt terminator latch.

3. The improved rescue system of claim 2 wherein said means for returning said power switch body to said power off position further comprises:
    a first switch return surface on said power switch body; and
    a power disengaging surface on said first belt terminator for forcibly engaging said first switch return surface so as to move said power switch body to said power off position as said first belt terminator is withdrawn from said first belt terminator receptor.

4. The improved rescue system of claim 3 wherein said power switch has a switch plate which is rotatably mounted in a surface of the case and said activating tab is pivotably mounted to said switch plate.

5. The improved rescue device of claim 1 wherein said mode switch further comprises:

a mode switch body translatably mounted in said second belt terminator receptor, said mode switch body terminating in a switch head and being so positioned as to assure that said switch head extends beyond the case when said mode switch is in said receive mode position;

further wherein said means for toggling said mode switch further comprises:

a resilient spring fixed with respect to the case and engaging said mode switch body, biassing said mode switch body to said receive mode position where said switch head of said mode switch body is at maximum extension with respect to the case; and a switch head engaging surface on said second belt terminator so positioned as to forcibly engage said switch head and move said mode switch to said transmit mode position when said second belt terminator is inserted into and lockably engaged with said second belt terminator receptor; and still further wherein said means for locking and releasing said first belt terminator further comprises:

a second terminator latch biassed to lockably engage said second belt terminator receptor when said second belt terminator is inserted therein; and means for releasing said second terminator latch.

6. The improved rescue device of claim 5 further comprising supplementary means for toggling said mode switch between said transmit mode position and said receive mode position.

7. The improved rescue device of claim 6 wherein said supplementary means for toggling said mode switch further comprises:

a switch body catch on said mode switch body;

a catch retainer having a catch engaging surface contoured so as to lockably engage said switch body catch when said mode switch is in said transmit mode position;

means for biassing said catch retainer toward said mode switch body; and means for overcoming said biassing means to disengage said catch engaging surface from said switch body catch.

8. An improved rescue device to be worn by an individual when in snow-covered regions subject to avalanche conditions, the rescue device having, a transmitter which generates a pulsed electromagnetic signal at a specified frequency, an antenna for transmitting the pulsed electromagnetic signal to provide a locating signal and for receiving signals from other transmitters, a receiver tuned to receive the locating signal of another transmitter via the antenna and generating an input signal proportional to the strength of the locating signal received, a speaker, a case for housing the transmitter, the antenna, and the receiver, a harness constructed from belts for securing the case to the individual, a first belt connector for attaching the harness to the case, and a second belt connector for attaching the harness to the case, the improvement comprising:

a first belt terminator which serves as the first belt connector;

a first belt terminator receptor which forms part of the case and which is configured to lockably engage said first belt terminator;

a power switch associated with said first belt terminator receptor, said power switch having a power switch body having a first switch advancing surface thereon and moving between a power on position and a power off position;

a probe engaging surface on said first belt terminator for contacting and advancing said first switch advancing surface so as to advance said power switch body to said power on position as said first belt terminator is inserted into said first belt terminator receptor;

means for returning said power switch body to said power off position when said first belt terminator is withdrawn from said first belt terminator receptor; and a first terminator latch biassed to lockably engage said first belt terminator when said first belt terminator is inserted into said first belt terminator receptor; and an activating tab for releasing said first belt terminator latch.

9. The improved rescue system of claim 8 wherein said means for returning said power switch body to said power off position further comprises:

a first switch return surface on said power switch body; and a power disengaging surface on said first belt terminator for forcibly engaging said first switch return surface so as to move said power switch body to said power off position as said first belt terminator is withdrawn from said first belt terminator receptor.

10. The improved rescue system of claim 9 wherein said power switch has a switch plate which is rotatably mounted in a surface of the case and said activating tab is pivotably mounted to said switch plate.

11. An improved rescue device to be worn by an individual when in snow-covered regions subject to avalanche conditions, the rescue device having, a transmitter which generates a pulsed electromagnetic signal at a specified frequency, an antenna for transmitting the pulsed electromagnetic signal to provide a locating signal and for receiving signals from other transmitters, a receiver tuned to receive the locating signal of another transmitter via the antenna and generating an input signal proportional to the strength of the locating signal received, a speaker, a case for housing the transmitter, the antenna, and the receiver, a harness constructed from belts for securing the case to the individual, a first belt connector for attaching the harness to the case, and a second belt connector for attaching the harness to the case, the improvement comprising:

a second belt terminator which serves as the second belt connector;

a second belt terminator receptor which forms part of the case and which is configured to lockably engage said second belt terminator;

a mode switch having a mode switch body which is translatably mounted in said second belt terminator receptor so as to move between a transmit mode position and a receive mode position, said mode switch body terminating in a switch head and being so positioned as to assure that said switch head extends beyond the case when said mode switch body is in said receive mode position;

a resilient spring fixed with respect to the case and engaging said mode switch body, said spring biassing said mode switch body to said receive mode position where said switch head of said mode switch body is at maximum extension with respect to the case;

a switch head engaging surface on said second belt terminator so positioned as to forcibly engage said switch head and move said mode switch body to said transmit mode position when said second belt terminator is inserted into and lockably engaged with said second belt terminator receptor;

a second terminator latch biassed to lockably engage said second belt terminator receptor when said second belt terminator is inserted therein; and means for releasing said second terminator latch.

12. The improved rescue device of claim 11 further comprising supplementary means for toggling said mode switch body between said transmit mode position and said receive mode position.

13. The improved rescue device of claim 12 wherein said supplementary means for toggling said mode switch body further comprises:

a switch body catch on said mode switch body;

a catch retainer having a catch engaging surface contoured so as to lockably engage said switch body catch when said mode switch is in said transmit mode position;

means for biassing said catch retainer toward said mode switch body; and means for overcoming said biassing means to disengage said catch engaging surface from said switch body catch.

* * * * *